United States Patent
Strzelczak et al.

(10) Patent No.: US 9,110,839 B2
(45) Date of Patent: Aug. 18, 2015

(54) STORAGE SYSTEM FOR STORING TARGET DATA AND ADDRESS DATA

(75) Inventors: Przemyslaw Strzelczak, Warsaw (PL); Elzbieta Adamczyk, Warsaw (PL); Urszula Herman-Izycka, Warsaw (PL); Jakub Sakowicz, Warsaw (PL); Lukasz Slusarczyk, Warsaw (PL); Jaroslaw Wrona, Warsaw (PL); Cezary Dubnicki, Warsaw (PL)

(73) Assignee: NEC CORPORATION, Tokyo (JP)

( * ) Notice: Subject to any disclaimer, the term of this patent is extended or adjusted under 35 U.S.C. 154(b) by 370 days.

(21) Appl. No.: 13/640,528
(22) PCT Filed: Aug. 25, 2011
(86) PCT No.: PCT/JP2011/004712
§ 371 (c)(1), (2), (4) Date: Oct. 11, 2012
(87) PCT Pub. No.: WO2012/029256
PCT Pub. Date: Mar. 8, 2012

(65) Prior Publication Data

US 2013/0036278 A1    Feb. 7, 2013

Related U.S. Application Data

(60) Provisional application No. 61/378,748, filed on Aug. 31, 2010.

(51) Int. Cl.
*G06F 12/00* (2006.01)
*G06F 11/14* (2006.01)
*G06F 3/06* (2006.01)

(52) U.S. Cl.
CPC .............. *G06F 11/14* (2013.01); *G06F 3/067* (2013.01); *G06F 3/0608* (2013.01); *G06F 3/0641* (2013.01); *G06F 3/0683* (2013.01); *G06F 11/1453* (2013.01)

(58) Field of Classification Search
CPC . G06F 11/1453; G06F 3/0641; G06F 3/0608; G06F 3/067
USPC ........................................................ 711/161
See application file for complete search history.

(56) References Cited

U.S. PATENT DOCUMENTS 7,451,168 B1   11/2008  Patterson
7,698,516 B2    4/2010  Todd et al.
(Continued)

FOREIGN PATENT DOCUMENTS

CN       101676855 A     3/2010
EP        2063351 A2     5/2009
(Continued)

OTHER PUBLICATIONS

Lorenz Huelsbergen et al., "Very Concurrent Mark-&-Sweep Garbage Collection without Fine-Grain Synchronization", Proceedings of the 1st International Symposium on Memory Management, Oct. 1, 1998, pp. 166 to 175, XP055104061, DOI: 10.1145/45/286860.286878, ISBN: 978-1-58-113114-7.
(Continued)

*Primary Examiner* — Aimee Li
*Assistant Examiner* — Prasith Thammavong
(74) *Attorney, Agent, or Firm* — Sughrue Mion, PLLC

(57) ABSTRACT

In a content address storage system, storage target data or address data is stored in a storage device with respect to each time zone divided in a time-series manner, and a storage region in the storage device storing a piece of data, which is not pointed to by other address data, of the storage target data or the address data stored in the storage device in a past time zone before a current time zone, is released.

10 Claims, 20 Drawing Sheets

(56) References Cited

U.S. PATENT DOCUMENTS

| | | | |
|---|---|---|---|
| 7,707,166 | B1 | 4/2010 | Patterson |
| 8,332,612 | B1* | 12/2012 | Raizen et al. ............... 711/202 |
| 8,527,544 | B1* | 9/2013 | Colgrove et al. ............ 707/791 |
| 2009/0113152 | A1 | 4/2009 | Eguchi et al. |
| 2009/0132619 | A1 | 5/2009 | Arakawa et al. |
| 2010/0064166 | A1 | 3/2010 | Dubnicki et al. |
| 2010/0070698 | A1 | 3/2010 | Ungureanu et al. |
| 2011/0138144 | A1* | 6/2011 | Tamura et al. ............... 711/166 |

FOREIGN PATENT DOCUMENTS

| | | |
|---|---|---|
| EP | 2164005 A2 | 3/2010 |
| JP | 2009129441 A | 6/2009 |
| JP | 2009-146381 A | 7/2009 |
| JP | 2010-079886 A | 4/2010 |
| JP | 2010-157204 A | 7/2010 |

OTHER PUBLICATIONS

Extended European Search Report dated Mar. 5, 2014, issued by the European Patent Office in corresponding European Application No. 11821280.2.

Office Action, dated Jun. 4, 2013, issued by the Japanese Patent Office in counterpart Japanese Application No. 2012-528161.

Cezary Dubnicki, et al., "HYDRAstor: a Scalable Secondary Storage", In FAST '09: Proceedings of the 7th conference on File and storage technologies (Berkeley, CA, USA, 2009), USENIX Association, pp. 197-210.

Paul R. Wilson, "Uniprocessor Garbage Collection Techniques" In IWMM '92: Proceedings of the International Workshop on Memory Management (London, UK, 1992), Springer-Verlag, pp. 1-42.

Saleh E. Abdullahi, et al., "Garbage Collecting the Internet: A Survey of Distributed Garbage Collection", ACM Comput. Surv, Sep. 1998, pp. 330-373, vol. 30, No. 3.

Edsger W. Dijkstra, et al., "On-the-Fly Garbage Collection: An Exercise in Cooperation", Commun. ACM, Nov. 1978, pp. 966-975, vol. 21, No. 11.

Petros Efstathopoulos, et al. "Rethinking Deduplication Scalability", In 2nd USENIX Workshop on Hot Topics in Storage and File Systems (Boston, MA, USA, Jun. 2010).

Andreas Haeberlen, et al., "Glacier: Highly durable, decentralized storage despite massive correlated failures", In NSDI'05: Proceedings of the 2nd conference on Symposium on Networked Systems Design & Implementation (Berkeley, CA, USA, 2005), USENIX Association, pp. 143-158.

Michael Abd-El-Malek, et al., "Ursa Minor: versatile cluster-based storage", In FAST '05: 4th USENIX Conference on File and Storage Technologies, 2005, pp. 59-72.

Sean Quinlan, et al., "Venti: a new approach to archival storage", In First UNSENIX conference on File and Storage Technologies, (Monterey, CA, 2002), USENIX Association, pp. 89-101.

Lawrence L. You, et al., "Deep Store: An Archival Storage System Architecture", In ICDE '05: Proceedings of the 21st International Conference on Data Engineering (Washington, DC, USA, 2005), IEEE Computer Society, pp. 804-815.

Mark Lillibridge, et al., "Sparse Indexing: Large Scale, Inline Deduplication Using Sampling and Locality", In FAST (2009), pp. 111-123.

Jiansheng Wei, et al., "MAD2: A Scalable High-Throughput Exact Deduplication Approach for Network Backup Services", In Proceedings of the 26th IEEE Symposium on Massive Storage Systems and Technologies (MSST), May 2010.

Bo Hong, et al, "Duplicate Data Elimination in a SAN File System", In Proceedings of the 21st IEEE/12th NASA Goddard Conference on Mass Storage Systems and Technologies (MSST(2004), pp. 301-314.

Dirk Meister, et al., "dedupv1: Improving Deduplication Throughput using Solid State Drives (SSD)" In Proceedings of the 26th IEEE Symposium on Massive Storage Systems and Technologies (MSST) (May 2010).

Dirk Meister, et al., "dedupv1: Improving Deduplication Throughput using Solid State Drives (SSD) (technical report)", Tech rep., Apr. 2010.

William J. Bolosky, et al., "Single Instance Storage in Windows® 2000", In Proceedings of the 4th USENIX Windows Systems Symposium, 2000, pp. 13-24.

Atul Adya, et al., "Farsite: Federated, Available, and Reliable Storage for an Incompletely Trusted Environment", 2002, pp. 1-14.

Austin T. Clements, et al. "Decentralized Deduplication in SAN Cluster File Systems", In Proceedings of the USENIX Annual Technical Conference, Jun. 2009.

Benjamin Zhu, et al., "Avoiding the Disk Bottleneck in the Data Domain Deduplication File System", In FAST'08: Proceedings of the 6th USENIX Conference on File and Storage Technologies (Berkeley, CA, USA, 2008), USENIX Association, pp. 269-282.

EMC Corp. EMC Centera: content addressed storage system, Jan. 2008. http://www.emc.com/products/family/emccentera-family.htm?-openfolder=platform.

Haryadi S. Gunawi, et al., "Deconstructing Commodity Storage Clusters", In Proceedings of the 32nd International Symposium on Computer Architecture (Madison, WI, Jun. 2005), pp. 1-12.

Deepavali Bhagwat, et al., "Extreme Binning: Scalable, Parallel Deduplication for Chunk-based File Backup", In Proceedings of the 17th IEEE/ACM International Symposium on Modelling, Analysis and Simulation of Computer and Telecommunication Systems (MASCOTS'09), London, UK, Sep. 2009.

Communication dated Dec. 29, 2014 from the State Intellectual Property Office of the People's Republic of China in counterpart application No. 201180041773.9.

\* cited by examiner

Fig. 1

| | Epoch of written block (new and deduplicated) | Epoch of addresses within read block |
|---|---|---|
| Regular block without pointers | current epoch | N/A |
| Regular block with pointers | minimum of epochs of block addresses inserted | epoch of supplied address |
| Retention root | N/A | current epoch |

STORAGE SYSTEM FOR STORING TARGET DATA AND ADDRESS DATA

TECHNICAL FIELD

The present invention relates to a storage system, and in particular, to a storage system with data deduplication.

BACKGROUND ART

Secondary storage for enterprise market needs to offer several features simultaneously to be successful. Large capacity, high performance and high reliability form core functionality required by backup and archival appliances. Since backup involves storage of multiple versions of similar data, deduplication is a logical new key feature of such systems. With deduplication, logical storage capacity is far larger than physical space available resulting in substantial savings. If deduplication is performed on backup streams on-the-fly, writing of duplicated blocks into a storage device can be avoided, which contributes to high performance. Further, as calculation required for deduplication is scaled by distributed processing, higher performance can be achieved, resulting in shortened backup windows which is of primary importance to enterprise customers.

A storage system disclosed in NPL 1 is a commercial, distributed storage system delivering all the features mentioned above. In brief, this system can be seen as a distributed storage system keeping a collection of blocks having variable lengths and being capable of referring to other blocks. The system uses content-derived block addresses and provides global in-line block deduplication. The storage system disclosed in NPL 1 is built on a DHT (Distributed Hash Table), supports self-recovery from failures, uses erasure codes to generate redundancy codes (parity) of data, and provides multiple user-selectable data resiliency levels.

CITATION LIST

Patent Literature

PTL 1: PATTERSON, R. H. Incremental garbage collection of data in a secondary storage. Patent, November 2008. U.S. Pat. No. 7,451,168.
PTL 2: PATTERSON, R. H. Probabilistic summary data structure based encoding for garbage collection. Patent, April 2010. U.S. Pat. No. 7,707,166.
PTL 3: TODD, S. J., KILIAN, M., TEUGELS, T., MARIVOET, K., AND MATTHYS, F. Methods and apparatus for managing deletion of data. Patent, April 2010. U.S. Pat. No. 7,698,516.

Non Patent Literature

NPL 1: DUBNICKI, C., GRYZ, L., HELDT, L., KACZMARCZYK, M., KILIAN, W., STRZELCZAK, P., SZCZEPKOWSKI, J., UNGUREANU, C., AND WELNICKI, M., Hydrastor: a scalable secondary storage. In FAST '09: Proceedings of the 7th conference on File and storage technologies (Berkeley, Calif., USA, 2009), USENIX Association, pp. 197-210.
NPL 2: WILSON, P. R. Uniprocessor garbage collection techniques. In IWMM '92: Proceedings of the International Workshop on Memory Management (London, UK, 1992), Springer-Verlag, pp. 1-42.
NPL 3: ABDULLAHI, S. E., AND RINGWOOD, G. A. Garbage collecting the internet: a survey of distributed garbage collection. ACM Comput. Surv. 30, 3 (1998), 330-373.
NPL 4: DIJKSTRA, E. W., LAMPORT, L., MARTIN, A. J., SCHOLTEN, C. S., AND STEFFENS, E. F. M. On-the-fly garbage collection: An exercise in cooperation. Commun. ACM 21, 11 (1978), 966-975.
NPL 5: EFSTATHOPOULOS, P., AND GUO, F. Rethinking Deduplication Scalability. In 2nd USENIX Workshop on Hot Topics in Storage and File Systems (Boston, Mass., USA, June 2010).
NPL 6: HAEBERLEN, A., MISLOVE, A., AND DRUSCHEL, P. Glacier: highly durable, decentralized storage despite massive correlated failures. In NSDI'05: Proceedings of the 2nd conference on Symposium on Networked Systems Design & Implementation (Berkeley, Calif., USA, 2005), USENIX Association, pp. 143-158.
NPL 7: ABD-EL-MALEK, M., II, W. V. C., CRANOR, C., GANGER, G. R., HENDRICKS, J., KLOSTERMAN, A. J., MESNIER,M. P., PRASAD, M., SALMON, B., SAMBASIVAN, R. R., SINNAMOHIDEEN, S., STRUNK, J. D., THERESKA, E., WACHS,M., AND WYLIE, J. J. Ursa minor: Versatile cluster-based storage. In FAST (2005).
NPL 8: QUINLAN, S., AND DORWARD, S. Venti: a new approach to archival storage. In First USENIX conference on File and Storage Technologies (Monterey, Calif., 2002), USENIX Association, pp. 89-101.
NPL 9: YOU, L. L., POLLACK, K. T., AND LONG, D. D. E. Deep store: An archival storage system architecture. In ICDE '05: Proceedings of the 21st International Conference on Data Engineering (Washington, D.C., USA, 2005), IEEE Computer Society, pp. 804-8015.
NPL 10: LILLIBRIDGE, M., ESHGHI, K., BHAGWAT, D., EOLALIKAR, V., TREZIS, G., AND CAMBLE, P. Sparse indexing: Large scale, inline deduplication using sampling and locality. In FAST (2009), pp. 111-123.
NPL 11: WEI, J., JIANG, H., ZHOU, K., AND FENG, D. Mad2: A scalable high-throughput exact deduplication approach for network backup services. In Proceedings of the 26th IEEE Symposium on Massive Storage Systems and Technologies (MSST) (May 2010).
NPL 12: HONG, B., AND LONG, D. D. E. Duplicate data elimination in a san file system. In Proceedings of the 21st IEEE/12th NASA Goddard Conference on Mass Storage Systems and Technologies (MSST (2004), pp. 301-314.
NPL 13: MEISTER, D., AND BRINKMANN, A. dedupvl: Improving Deduplication Throughput using Solid State Drives (SSD). In Proceedings of the 26th IEEE Symposium on Massive Storage Systems and Technologies (MSST) (May 2010).
NPL 14: MEISTER, D., AND BRINKMANN, A. dedupvl: Improving deduplication throughput using solid state drives (technical report). Tech. rep., April 2010.
NPL 15: BOLOSKY, W. J., CORBIN, S., GOEBEL, D., AND DOUCEUR, J. R. Single instance storage in windows 2000. In Proceedings of the 4th USENIX Windows Systems Symposium (2000), pp. 13-24.
NPL 16: ADYA, A., BOLOSKY, W., CASTRO, M., CHAIKEN, R., CERMAK, G., DOUCEUR, J., HOWELL, J., LORCH, J., THEIMER, M., AND WATTENHOFER, R. Farsite: Federated, available, and reliable storage for an incompletely trusted environment, 2002.
NPL 17: CLEMENTS, A., AHMAD, I., VILAYANNUR, M., AND LI, J. Decentralized deduplication in san cluster file systems. In Proceedings of the USENIX Annual Technical Conference (June 2009).

NPL 18: ZHU, B., LI, K., AND PATTERSON, H. Avoiding the disk bottleneck in the data domain deduplication file system. In FAST'08: Proceedings of the 6th USENIX Conference on File and Storage Technologies (Berkeley, Calif., USA, 2008), USENIX Association, pp. 1-14.

NPL 19: EMC Corp. EMC Centera: content addressed storage system, January 2008. http://www.emc.com/products/family/emccentera-family.htm?-openfolder=platform.

NPL 20: GUNAWI, H. S., AGRAWAL, N., ARPACI-DUSSEAU, A. C., ARPACIDUSSEAU, R. H., AND SCHINDLER, J. Deconstructing Commodity Storage Clusters. In Proceedings of the 32nd International Symposium on Computer Architecture (Madison, Wis., June 2005).

NPL 21: BHAGWAT, D., ESHGHI, K., LONG, D. D. E., AND LILLIBRIDGE, M. Extreme binning: Scalable, parallel deduplication for chunk-based file backup.

SUMMARY OF INVENTION

Technical Problem

The deletion procedure in the storage system disclosed in NPL 1 is in a way similar to the traditional garbage collection in which blocks not needed by anybody are deleted and their space is reclaimed. However, the deletion is significantly complicated by deduplication, distributed storage configuration, and requirements on failure tolerance. For example, a simple solution of disabling deduplication when deletion is running may increase space consumption, which may be not acceptable. Far better approach is to allow deduplication all the time, even concurrently with deletion.

As such, an exemplary object of the present invention is to provide a storage system capable of effectively utilizing a storage space while realizing data deduplication, which is the problem to be solved as described above.

Solution to Problem

According to an aspect of the present invention, a storage system is configured to include, a data storage controlling unit that stores storage target data and address data in a storage device, the address data being data based on a data content stored in a pointed object and a storage location and pointing to the storage target data or other address data, and when attempting to store, in the storage device, another piece of storage target data having a data content identical to the data content of a piece of the storage target data having been stored in the storage device, stores, in the storage device, the address data pointing to the piece of the storage target data having been stored in the storage device as the other piece of storage target data; and a data release controlling unit that releases a storage region in the storage device, the storage region storing a piece of data, which is not pointed to by other address data, of the storage target data or the address data stored in the storage device, wherein the data storage controlling unit stores the storage target data or the address data in the storage device with respect to each time zone divided in a time-series manner, and the data release controlling unit releases a storage region in the storage device, the storage region storing a piece of data, which is not pointed to by other address data, of the storage target data or the address data stored in the storage device in a past time zone before a current time zone.

According to another aspect of the present invention, a computer-readable medium stores a program including instructions for causing an information processing device to realize:

a data storage controlling unit that stores storage target data and address data in a storage device, the address data being data based on a data content stored in a pointed object and a storage location and pointing to the storage target data or other address data, and when attempting to store, in the storage device, another piece of storage target data having a data content identical to the data content of a piece of the storage target data having been stored in the storage device, stores, in the storage device, the address data pointing to the piece of the storage target data having been stored in the storage device as the other piece of storage target data; and a data release controlling unit that releases a storage region in the storage device, the storage region storing a piece of data, which is not pointed to by other address data, of the storage target data or the address data stored in the storage device, wherein the data storage controlling unit stores the storage target data or the address data in the storage device with respect to each time zone divided in a time-series manner, and the data release controlling unit releases a storage region in the storage device, the storage region storing a piece of data, which is not pointed to by other address data, of the storage target data or the address data stored in the storage device in a past time zone before a current time zone.

According to another aspect of the present invention, an information processing method is configured to include, storing storage target data and address data in a storage device, the address data being data based on a data content stored in a pointed object and a storage location and pointing to the storage target data or other address data, and when attempting to store, in the storage device, another piece of storage target data having a data content identical to the data content of a piece of the storage target data having been stored in the storage device, storing, in the storage device, the address data pointing to the piece of the storage target data having been stored in the storage device as the other piece of storage target data; releasing a storage region in the storage device, the storage region storing a piece of data, which is not pointed to by other address data, of the storage target data or the address data stored in the storage device; performing storage of the storage target data or the address data in the storage device with respect to each time zone divided in a time-series manner; and releasing a storage region in the storage device, the storage region storing a piece of data, which is not pointed to by other address data, of the storage target data or the address data stored in the storage device in a past time zone before a current time zone.

Advantageous Effects of Invention

As the present invention is configured as described above, it is possible to provide a storage system capable of effectively utilizing storage spaces while realizing data deduplication.

BRIEF DESCRIPTION OF DRAWINGS

FIG. 1 shows rules of epoch assignment according to a first exemplary embodiment;

DESCRIPTION OF EMBODIMENTS

<First Exemplary Embodiment>

Figure 2:
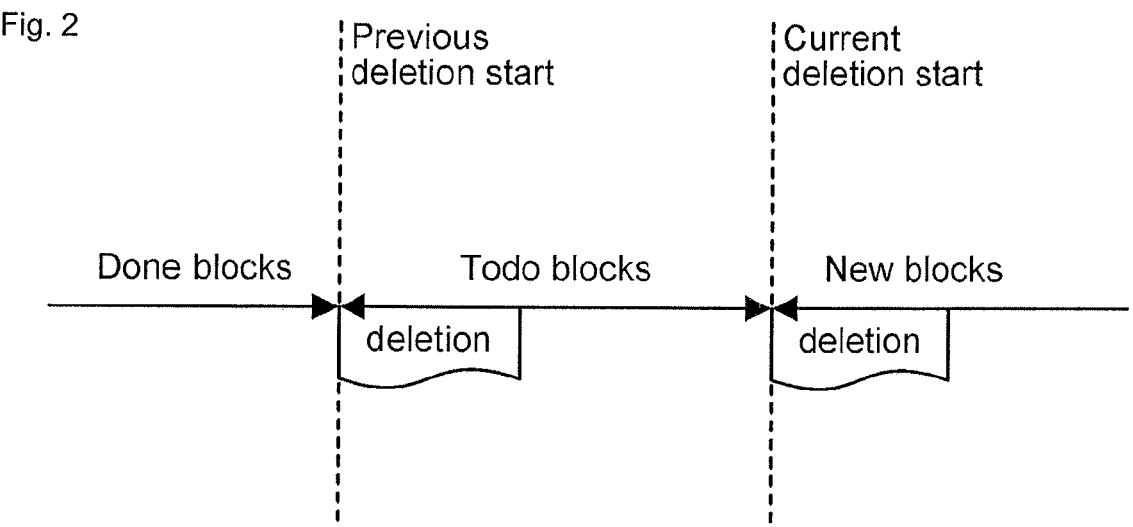
FIG. 2 shows classification of blocks according to the first exemplary embodiment.

The present embodiment makes the following contributions. First, it identifies requirements for deletion in a distributed deduplicated block store. Second, it presents an algorithm satisfying these requirements and which has been implemented in a commercial system. Third, it discusses the results of an evaluation of the deletion procedure, demonstrates its efficiency and illustrates impact of the deletion on critical user operations.

The present embodiment is organized as follows. First, deletion requirements will be summarized. Then, user-visible semantics of deletion and associated data model will be defined. Then, the challenges facing deletion implementation in the system disclosed in NPL 1 will be described. Then, the deletion algorithm will be discussed in details. Further, description of how the deletion procedure implemented addresses the requirements identified earlier, including performance, will be given. Finally, related work will be discussed, and conclusion and future work will be provided.

(Requirements on Deletion)

The deletion in all systems must first of all let users delete data selectively and preserve data which users decided to keep. Usually, once data is marked for deletion, space reclamation is done immediately to ensure efficiency in terms of storage utilization. But, unlike primary storage, secondary storage can delay retrieving unused space. Immediate data removal is not as important because deduplicated storage is much more space-efficient and space reclamation is much more complicated for CAS (Content Addressable Storage) systems.

In enterprise backup system, we need to minimize the impact of deletion on user operations such as backup, restore and replication. This functionality is expected to be available 24×7 and its performance should not suffer much, if at all, due to deletion running. The earlier versions of a storage system show that limiting running deletion to read-only periods is difficult to accept as it may result in rearranging backup windows. Moreover, such restriction is practically impossible in case of a continuous backup policy.

Since running deletion consumes system resources, it impacts the overall system performance. Reducing this impact is one of the deletion implementation goals. Additionally, the deletion must scale with the whole system. It is expected that changing computation power and disks capacity proportionally will keep the impact of the deletion on overall performance at the same level.

With increasing number of machines and disks in the system, the probability of hardware failures increases. To ensure system availability, the deletion process must be able to continue its operation in the presence of multiple disk, node and network failures. Moreover, since ability to delete data is critical for operation of the system, the deletion process should be able to re-start and finish even in case of permanent data failure; so resiliency of deletion should be in fact higher than resiliency of user data.

Further, last but not least, the deletion should not require additional significant storage to complete.

(User-Visible Semantics)

(Data Model)

A basic data unit visible for a user of the storage system disclosed in NPL 1 is a block. Besides binary data, blocks can contain pointers to other blocks. Block address is derived from the block content, including pointers to other blocks, if there are any. Content-addressing implies that blocks are immutable, as otherwise their addresses would change. There are two distinct block types: regular blocks and searchable blocks, in the present invention.

A searchable block can be read with its associated search key, not with a cryptic content-derived address needed to read a regular block. The search key can be an arbitrary string and is provided by the user along with binary data and pointers on searchable block write. Because searchable blocks are read with their keys only, the system prevents writing two searchable blocks with the same key and different content. Searchable blocks do not have a regular address and cannot be pointed by other blocks.

Since the storage system disclosed in NPL 1 supports deduplication, an address returned by a regular block write can refer to an already existing block called a base block for this duplicate write. Deduplication also works for searchable blocks.

With these types of blocks and related operations, a user can create a graph of blocks. Since blocks are immutable, such graphs are acyclic. To avoid dangling pointers, block addresses cannot be derived from a block content by users without writing such block first; therefore block graphs can be built in bottom-up fashion only.

(Deletion Granularity)

The system does not provide a way to remove individual blocks. Instead, it allows to mark all blocks reachable from a given searchable block as no longer needed. More precisely, there are two sub-types of searchable blocks: retention roots and deletion roots. We say that a retention root matches a deletion root if their searchable keys are equal. A retention root marks blocks reachable from it as the ones to be preserved, whereas a deletion root "cancels out" this property for the matching retention root. Note that we use an extra marker to differentiate a sub-type of searchable blocks, so in fact the requirement on key uniqueness applies to retention roots only. We say that a retention root is alive if there is no matching deletion root in the system. Regular blocks reachable from any alive retention root are alive. If a block is not alive, we call it dead.

Instead of marking the entire graph of blocks for deletion, it is in theory possible to deliver an operation to delete a single block. However, this would complicate keeping track of individual block deletion and, most importantly, could lead to creation of a dangling reference by deletion of a block pointed by another existing block in the system.

We note that a malicious user can delete blocks of other users if he knows appropriate search key. This problem is easily addressed by encrypting keys of searchable blocks with a user-specific id.

(Synchronization between Deletion and Users using Epochs)

Writing of blocks with pointers while deletion is running creates a problem for deletion as described so far. Suppose that a user wants to write a regular new block A and retain this block by writing a retention root R pointing to A. Since the system-returned address of A has to be inserted into the contents of R, submission of R's write request must be preceded by a successful completion of write of A. If the deletion runs in between writing of these two blocks, we may delete A because it is dead according to the definition given above.

We solve this problem by extending the set of alive blocks to include blocks which can be kept by users and all blocks reachable from them. Since a user can potentially keep all blocks, we additionally restrict which blocks can be remembered by users. This is done by introduction of a virtual time built with so-called epochs. An epoch is a global counter representing an advance operation of generation. At any given point of time, the system is in only one epoch called the current epoch.

Each block address obtained by a user has an epoch associated with this address. The system verifies on writing that an address with the associated epoch T can only be used in epoch T and T+1. For reading, user can still use an address with an older epoch associated but the read may fail if the block was deleted.

For an address of a given block, its epoch may change depending on how this address was obtained. The rules of epoch assignment are given in FIG. 1. This level of detail is presented here for completeness but will also be described later.

On writing of a regular block without pointers, the system returns a block address with the current epoch associated. When a block being written contains pointers, the epoch returned with this write is the minimum of epochs of block addresses inserted into this block (so-called minimum rule). Searchable blocks do not have regular addresses so no epoch is assigned. An epoch returned on write does not depend on duplicate status of a block being written.

Block addresses can also be obtained by reading blocks with pointers. Epochs of pointers obtained by reading a block are identical. For a regular block with pointers, this epoch is equal to the epoch associated with the address of the read block. For a searchable block with pointers, the epochs are equal to the current epoch.

Recall that process of tree building requires a user to keep the addresses of already written blocks to insert them into parent blocks. However, after epoch introduction, only addresses stamped with the current and the previous epoch are allowed in successive blocks creation.

After the epoch is advanced from T to T+1 (application of an advance operation), all users are notified about it in order to discard all block addresses with epoch T. Here discarding pointers means committing them to a tree pointed by an alive retention root. This needs to be completed before the epoch can be advanced to T+2. In epoch T+2, the system rejects writing blocks with pointers when even a single pointer has an address with an associated epoch smaller than T+1. The system also rejects attempts to read not alive retention roots to restrict the set of block addresses that can be kept by users. Such constraint is irrelevant for correctly behaving users but essential for the system to deliver a correct deletion procedure.

By introducing and enforcing epoch restrictions described above, the deletion is able to identify inaccessible older blocks to be removed while users can continue writing new data to the system and read all accessible blocks.

(Deletion Challenges)
(Root Set Determination)

In a typical garbage collection, object accessibility is determined with respect to the root set usually composed of global and active local variables of a running program. "Alive objects" belong directly to the root set or can be reached from the root set by graph traversal. Since garbage collection in program runtime has full knowledge about program variables, computation of the root set is well-understood. It is much more difficult in systems like the storage system disclosed in NPL 1, because its root set contains not only alive retention roots corresponding to global variables, but also blocks which addresses can be still remembered by users (which are like local variables in programming languages). As pointed out above, if no restriction had been placed on a user with respect to the right of remembering block addresses, all blocks would constitute a root set in the storage system disclosed in NPL 1. The introduction of epoch restriction limits root set and enables deletion in the present invention. As a result, our root set includes only (1) alive retention roots, and (2) user kept addresses suitable for writing which by epoch restriction can only have the current or the previous epoch associated.

(Deduplication Influence)

To avoid increased storage consumption caused by deletion, we reject solutions disabling deduplication during deletion. As a result, a block scheduled for deletion can be resurrected as a side result of deduplication. Preservation of such blocks is a fundamental challenge in our deletion algorithm.

(Distribution)

A distributed storage system often changes node configuration due to node additions, removals and failures; and as a result, data distribution within the system also changes. The deletion algorithm must be able to locate necessary data and metadata in spite of their changing locations.

Until now, we have discussed user view of blocks in the storage system disclosed in NPL 1. However, the internal data organization the deletion process operates on differs substantially from the one visible by user.

Internally the storage system disclosed in NPL 1 is composed of supernodes. Each supernode is identified by prefix of hash space it is responsible for. Hash spaces of supernodes are disjoint and cover entire hash space. Every supernode is responsible for handling user writes and reads of blocks with content-based hashes belonging to the hash space of this supernode. The supernode itself is divided into a fixed number of peers. On write, a block is erasure coded and resulting fragments are then distributed to peers that append received fragments to fragment containers which are separate for each peer. Peers themselves are usually distributed over physical machines to provide node failure resiliency.

The deletion algorithm must make a consistent decision to preserve or remove all fragments of one block.

(Failure Tolerance)

The deletion procedure must be able to proceed in spite of a moderate number of node and disk failures. Moreover, deletion should cope with nodes temporarily unavailable due to intermittent network failures, which will re-appear sometime in the future. In particular, the deletion algorithm has to be able to distinguish fragments of logically removed blocks found on previously dead machines from the ones that are still alive.

(Physical Resources Usage)

The storage system disclosed in NPL 1 is a persistent storage so obviously fragments are kept on the disk. In particular, retrieval of pointed blocks addresses from the parent block may require at least one disk access. Deletion algorithm must take into account disk, memory and network access patterns to use these resources efficiently.

(Deletion Algorithm)

(Overview)

The storage system disclosed in NPL 1 uses a well-understood technique of reference counting. Each block has a reference counter tracking the number of other blocks pointing to the counter owner. However, when a new block is written counters of pointed blocks are not altered on-the-fly. Such immediate update would be very expensive due to possibly random I/O for every child block that can be located anywhere in the system. Instead, reference counters are updated in a background deletion process run periodically.

Block counters are persistent and replicated on all peers storing block fragments. For every fragment, there are two versions of counter during deletion: an effective one that is persistent and a temporary one used to store partial result of deletion algorithm. On a peer failure temporary counters can be discarded with no harm to the persistent ones.

The whole deletion consists of two phases run periodically: garbage identification in which new counter values are computed. This phase is followed by space reclamation during which storage space can be reclaimed by removing garbage identified in the first part. Such division is possible because, as pointed out above, there is no need for immediate reclamation in secondary storage systems. Moreover, allowing garbage identification and space reclamation proceed in parallel would extend duration of the former due to special treatment required by duplicate writes. To recognize a write as a duplicate in such case, the system would have to check if reclamation of the block had not started on any of the peers, and doing so would require synchronization between duplicate writes and physical reclamation.

In the below description, by deletion we denote the garbage identification phase only. Each run of this phase calculates counters of blocks written only up to certain moment in time. Every started run divides blocks in three disjoint classes as shown in FIG. 2. The first class contains blocks written before the last successful deletion start. We call them done blocks. The second class contains blocks written later but before the current deletion start—we call them todo blocks. Finally, blocks written after the current deletion start belong to the third class called new blocks.

Todo blocks will be processed by the current deletion to reflect not processed pointed-to relations to both todo and done blocks. This can result both in incrementation and decrementation of a counter of some done or todo block. New blocks are not processed in this deletion run and they do not influence values of others block counters for now. This influence will be computed in the next deletion run. In particular, all new deletion roots have no effect in this deletion run. Until the next deletion finishes, all new blocks are simply preserved and their counters are set to a special initial value.

Next deletion run will process only new blocks which will become todo blocks for this run, i.e. the counters update process is incremental.

Each deletion run proceeds in subphases carried out in sync by a subset of peers in every supernode.

First, initial participants of the deletion algorithm are selected in every supernode. Peers can only take part in computation if their data state is good enough. For example, all blocks with pointers must be present in the current location of a peer for this peer to be able to perform the steps of the deletion algorithm. Selected peers are then called good peers and each of them performs identical tasks to identify garbage blocks, i.e. there is a high redundancy in deletion computation. Remaining peers are idle during deletion algorithm and eventually receive final counters from others in the background after deletion ends.

Next, all todo blocks that point to other blocks are read in, their pointers are distributed and their target blocks counters are incremented. During incrementation, the initial value is treated as 0.

After incrementation is done, we need to identify starting blocks for decrementation. These include retention roots with matching deletion roots as well as regular todo blocks that did not get their counters incremented (for now, we assume there are no new blocks pointing to them). Counters of such blocks are changed to 0.

All pointers from so identified garbage cause counters decrementation in blocks pointed by the garbage. Decrementation, however, may also lead to some other block counters fall to 0. Thus, new garbage is possibly identified again, and decrementation is repeated until no new garbage is found.

Switching to new counters is made in a two-phase commit described later. After commit, garbage blocks are no longer readable and space occupied by them is reclaimed in the background.

Any peer failure reduces the set of good peers. If the number of good peers within any supernode drops below some configurable minimum, the whole deletion process is aborted and its partial results are abandoned.

The deletion process as sketched above works smoothly but only if there are no new writes. With new writes, there are major complications addressed below.

(Complications)

Figure 3:
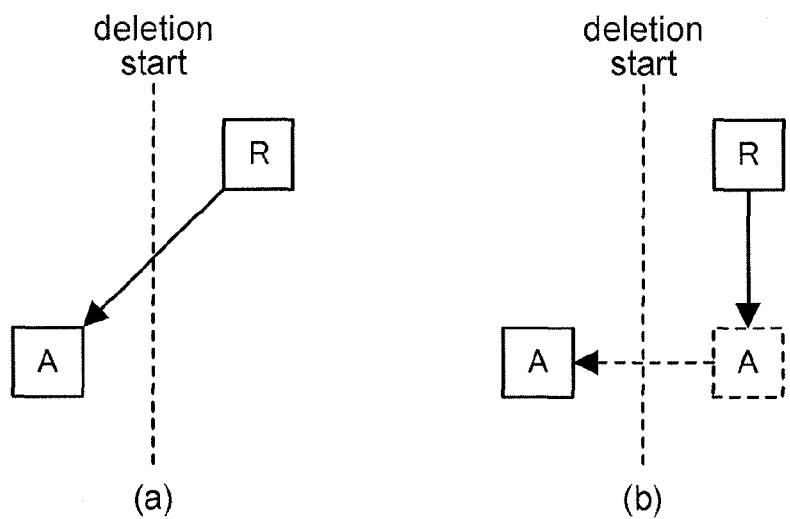
FIGS. 3(a) and 3(b) show a problem caused at the time of deleting blocks according to the first exemplary embodiment.

Consider the case in FIG. 3(a), in which a block A has been written just before the deletion start and a retention root R pointing to A has been written just after this point in time. Here, A is definitely not pointed by any other block but R which is new; hence, skipped by the identification process. As a result, A is removed incorrectly. It should be noted that while FIG. 3(a) shows the case where the retention root pointing to block A has been written after the deletion start, the block A should not be deleted.

Figure 4:
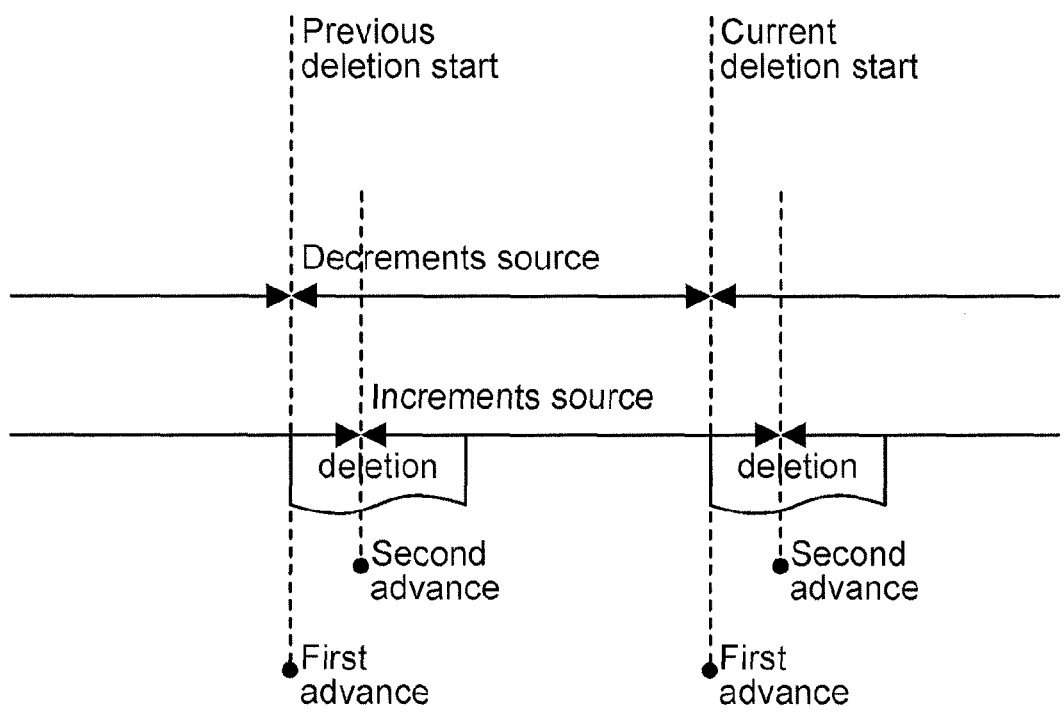
FIG. 4 shows states of advancing epochs according to the first exemplary embodiment.

A solution to this problem makes use of epoch restriction described above. Recall that a user is not allowed to keep an address older than the previous epoch. Therefore, it is enough to advance the epoch twice and assure that blocks written between the first and the second advance will have their increments sent as presented in FIG. 4. Note that we do not send decrements from such blocks as it would lead to removal of some new blocks and violation of our basic assumption to preserve new blocks unconditionally. Therefore, the epoch is always incremented by one to thereby shift to the next generation as shown in FIG. 4.

The second advance ensures that the address of block A obtained before the deletion started is discarded by a user, so no new references to A can be created. The only new blocks that can point to A are the ones written after the first and before the second advance. But these are precisely the ones we send additional increments from.

The next problem is caused by deduplication and is illustrated by FIG. 3(b). Consider a todo block A which is not pointed by any other block when the current deletion starts. If a user writes a duplicate block A and then retention root R that points to A, both should be preserved. However, the deletion process will identify A as garbage since neither any todo nor old block points to it. Removal of A is then incorrect and leads to data loss.

To solve this problem, base blocks of duplicate writes are marked on write as non-removable during the current deletion by setting a so-called undelete marker. On deletion completion, whenever a block is about to be removed (i.e. its newly computed counter is 0) and has the undelete marker set, such block is preserved by restoring its counter to the initial value. If the deletion is not in progress, duplicate writes do not set any markers.

After all new counter values have been computed, no new undelete markers are set for duplicate writes. Continuing writing such markers would create a race between setting and using them to restore counter to the initial value. Instead, we use so-called base block filtering to avoid resolving a write as a duplicate if its base block is just about to be deleted. Only if still temporary but ready to be committed counter of the base block is positive or undelete marker is set, the write is deduplicated. Otherwise, a fresh block is written even if its potential base block already exists in the system.

A completed deletion run may result in undeleted blocks with counter values set to the initial value. The next deletion run needs to decide if these blocks really should be kept. This is done with additional recursive incrementation, as needed. For each undeleted block pointed by at least one of the new deletion todo blocks we recursively send increments to pointed blocks.

Note that, in the context of the last completed deletion run, undeleted blocks can only be pointed by other undeleted blocks or new blocks. If a given undeleted block is reachable by any new block, such undeleted block will be reached by recursive incrementation process described above. Otherwise, an unreachable undeleted block will be identified as garbage by this deletion run.

(Details)
(Deletion and Epoch Changes)

A deletion run covers one full epoch and a part of the next one as shown on FIG. 4. The first epoch called preparation epoch allows users to discard addresses with old epochs, as described above. In the second epoch, called deletion marking epoch actual deletion computation is performed. There is no reason to bump current epoch at the end of the deletion run. Advance operations are coordinated by a separate entity in the system that makes sure that the next advance is executed only if all users confirmed disposal of the old addresses.

(Counters Incrementation)

After the epoch is advanced twice and good peers are selected, batch incrementation based on todo blocks starts (increments source is depicted in FIG. 4). Addresses of blocks in todo blocks with pointers are read by good peers and pairs (source_address, destination_address) are routed to good peers in supernodes responsible for the destination addresses. Destination good peers do not increment target block counter on message receipt. The reason for this is twofold: messages can get duplicated over the network so one could increment a counter more than once. Moreover, it would be inefficient to access counters of random blocks many times to do increments one-by-one. Instead, all pointers received are saved to temporary local storage and later read, made unique, and applied to temporary counters in batches.

After batch incrementation, the system locates undeleted blocks that got their counters incremented and performs recursive incrementation as mentioned above.

When the whole incrementation is done, some regular todo blocks (as opposed to retention or deletion roots) may have still the initial value set, which means that no new pointer points to them. All such blocks are an additional input for decrementation algorithm described below.

(Counters Decrementation)

Counters decrementation starts with initially identified garbage roots and proceeds recursively until no more new garbage is found as described above. A single round of distribution of decrements and actual decrementation works in the same way as incrementation with the only difference that it decreases counters instead of increasing them.

(New Counters Commit)

Once the last round of decrementation ends, computed counters equality is verified for each supernode. Counters mismatch on any supernode would indicate software failure. If any mismatch is found, deletion process is aborted. After successful verification, temporary counters are made persistent and the system is ready to use them. Good peers vote to enter proper commit phase in which the system starts to use new counters. From now on, each node restarted after failure strives to complete counters commit. The switch itself is quick as it requires only replacement of metadata of all fragment containers.

(Undelete Markers Organization and Handling)

As described above, a duplicate write during deletion triggers writing of a special undelete marker on each good peer. Undelete markers are not set for new blocks because such blocks are never deleted by the current deletion run.

After decrementation, whenever a block has a new counter value zero and undelete marker set, its counter will be re-set to the initial value so this block will no longer be treated as garbage.

Deduplication as a part of block write is a basic operation and its performance is critical for the performance of the whole system. Therefore, setting undelete marker must be very efficient. This is achieved by keeping undelete markers in good peer memory as bit maps. This is safe because deletion proceeds as long as there are enough good peers in every supernode.

(Base Block Filtering Process)

Once the commit starts, undelete markers are no longer written. Instead, every candidate for a base block identified during a write is checked if it is to survive the current deletion. This is done through a query to all good peers. A peer's answer is positive only if an undelete marker is set for this block or a recently computed but still temporary counter of this block is positive. With positive answer, the deduplication is performed; otherwise a new block is written.

When all good peer answers are received, the final answer is computed as a logical conjunction of all collected answers. This is because all good peers must return positive answers to make sure the base block candidate will be preserved after this deletion run ends. Partial answers may be inconsistent because undelete marker writes issued earlier may fail leaving undelete markers set only on some good peers.

(Application of Undelete Markers to Counters)

When an inconsistency of undelete markers is detected, they are made consistent by applying logical conjunction to bits gathered from all good peers within a supernode and distributing the result back to all good peers. After that, for each block with the undelete marker set and the computed counter value equal to the final zero, we change this counter value to the initial zero.

(Space Reclamation Overview)

As a result of the garbage identification, some block counters may drop to zero. Although each such block is no longer readable, it still occupies storage resources. Reclaiming those resources requires rewriting the whole containers where the fragments of this block reside, so it is a heavy-duty operation. To avoid needless heavy work, storage resources are reclaimed when they are needed or when there are free cycles to perform the reclamation. To reclaim as much storage resources as soon as possible, priority is given to containers that have the highest ratio of fragments to be removed.

(Deletion Correctness Analysis)

We will prove that the above deletion procedure is correct, i.e. it does not remove blocks reachable from root set as defined above. Ideally, we should also be able to show that garbage identification removes all blocks not reachable from the root set. It is not the case, however, because at any point of time a user can remove an address of a block from the memory, hence remove that block from current root set. For instance, a user can write a fresh regular block while garbage identification is in progress and immediately forget the address of this block. Still, the block referred to by such address will not be removed although it is not reachable by blocks from root set. Therefore, we will only prove that the deletion removes a large class of blocks. Let us start with the following lemma useful to prove the main theorem.

(Lemma 5.1) Blocks with addresses with associated epoch T−2 reachable by retention roots written in system epoch T−1 will be preserved by deletion run that ends in epoch T.

(Proof) As described above, increments are sent from retention roots written in T−1 and propagated to all blocks reachable by such retention roots, in particular blocks with epoch T−2.

Now we introduce some terminology useful to prove our claims. Consider user operations like reads, writes and forgetting obtained addresses executed during garbage identification from the first advance until the deletion run end. The number of such operations is finite and they are done in some order; let us assign consecutive natural numbers to them. Having the order defined, let Math.1 be a sequence of sets of addresses remembered by a user restricted to addresses valid for writing, i.e. we assume that in epoch T, the user does not keep addresses from epochs T−2 and earlier. Additionally, we define a parallel sequence Math.2 of sets consisting of retention roots which are alive before the first advance. Sets $R_i$ change with each newly written root after the first advance. Deletion roots written after the first advance are not taken into account here as they do not influence this deletion run. Let Math.3. Operations that modify $U_i$ are regular block writes, reads of any type of block and forgetting kept addresses. Operations that modify $R_i$ are retention root writes. Every operation changes only one of these sets.

$$\{U_i\}_{i \in 1 \ldots n} \quad [\text{Math.1}]$$

$$\{R_i\}_{i \in 1 \ldots n} \quad [\text{Math.2}]$$

$$S_i = U_i \cup R_i \quad [\text{Math.3}]$$

Note that at i-th moment any member of $U_i$ is readable. To prove the correctness of the deletion procedure, it is enough to show that all blocks reachable from $S_n$ are preserved. For this we will prove stronger thesis.

(Theorem 5.2) (Correctness property) The following members of set $S_i$ will be preserved by the deletion run that ends in epoch T:

1. all retention roots that belong to $R_i$,
2. all addresses in $U_i$ with an associated epoch equal to T−1 or T,
3. addresses in $U_i$ with epoch T−2 if pointed by any retention root from $R_n$,
4. all blocks reachable from (1), (2), or (3).

(Proof) The proof will proceed by induction.

Basis: $S_0$ can contain only alive retention roots and addresses from T−2. Blocks reachable from such retention roots will not be removed by the deletion because it is a natural property of reference counting applied. Addresses from T−2 satisfy the thesis by Lemma 5.1.

Inductive step: Let $S_i$ satisfy the thesis. $S_{i+1}$ can be created from $S_i$ as a result of one of the following operations: (1) The removal of addresses being forgotten that makes $S_{i+1}$ satisfy the thesis trivially. (2) The addition of addresses read from a retention root that belongs to $R_i$. Addresses read satisfy the thesis by inductive hypothesis. (3) The addition of addresses read from a block with epoch T−2 from $U_i$ with pointers. Addresses read are from epoch T−2 (see FIG. 1) and will be preserved if reachable by any retention root from $R_n$ by Lemma 5.1. (4) The addition of addresses read from block with epoch T−1 or T from $U_i$ with pointers. Addresses read are reachable from $U_i$ and have epoch T−1 or T so will be preserved by inductive hypothesis. (5) The addition of an address obtained by writing a regular block without pointers. The obtained address will be from epoch T−1 or T. If the block was not deduplicated, it is simply not deleted by the current garbage identification. Otherwise, either an undelete marker is set or a base block filtering confirms block existence after deletion run ends. Both assure the base block is not deleted by current deletion.

(6) The addition of an address obtained by writing a block with pointers where at least one address inserted is from epoch T−2. By so-called minimum rule stated in FIG. 1, such returned address will have epoch T−2 associated and will be preserved conditionally by Lemma 5.1. (7) The addition of an address obtained by writing a block with pointers where all addresses inserted have epoch T−1 or T. Again, if such block was not deduplicated, it is simply not removed by the current deletion. If such write was resolved as duplicate, the base block is preserved as in the case of (5). Pointed blocks are from $U_i$ so they are preserved by inductive hypothesis. (8) Extending $R_i$ by writing a retention root during system epoch T−1. Blocks readable from such retention root are preserved because the incrementation process covers them. (9) Extending $R_i$ by writing a retention root during system epoch T. Such retention root can only have inserted addresses from T−1 and T from $U_i$ preserved by inductive hypothesis.

Now we will define the class of blocks that the deletion removes.

(Theorem 5.3) (Non-emptiness property) A deletion run identifies as garbage blocks that are written before the deletion starts and are simultaneously 1. not reachable by any alive retention root before the deletion starts, and
2. not reachable by any retention roots written before the first and the second advance, and
3. not used as base blocks for duplicate elimination during this run.

(Proof) From setup of borders of increments and decrements, such blocks will have their counters computed 0. If such blocks were not used as base blocks for duplicate elimination during deletion, 0 counter becomes effective and such blocks are removed.

(Addressing Deletion Requirements)

The deletion algorithm satisfies all requirements mentioned above. The algorithm features a well-defined block aliveness semantics described earlier. All "alive blocks" are preserved, most "dead blocks" are deleted. Some potential garbage blocks may be temporarily kept by the system because the deletion algorithm is conservative. However, such blocks are kept only up to the next deletion run, which will identify these blocks as garbage.

Clients are able to write into the system with no interruptions during deletion because of the epochs restriction described above. The lightweight mechanism of undelete markers allows for good deduplication effectiveness and write performance while the deletion is running.

As the performance evaluation presented below shows, the deletion causes quite limited drop in overall user-visible system performance because of design decisions like: (1) deferring space reclamation and reference counters update; (2) efficient distribution of increments and decrements and their application in batches to temporary counters; (3) starting space reclamation from containers with the highest ratio of space to be gained; and (4) keeping undelete markers in good peers memory.

The scalability of the deletion algorithm is similar to the scalability of the entire system as deletion computation is distributed among supernodes. The deletion copes with the dynamic nature of the system using internal DHT, in the same way as it is done for data location for user writes and reads.

The deletion process is resilient to peer failures. They rarely terminate the garbage identification process, due to redundancy of computation among peers. The identification continues as long as there is sufficient number of good peers for each supernode. Counters verification, described above, gives protection from the most harmful software failures.

(Performance Evaluation)

All experiments use a content-addressable storage system composed of 4 storage nodes (SNs) and 2 access nodes (ANs), except where noted. All servers run the Red Hat EL 5.3 Linux, have 2 quad core 3 GHz CPUs and 4 GigE cards. Each SN has 24 GB of RAM and 12 1TB SATA disks whereas each AN has 8 GB of RAM and a limited local storage.

The experiments were performed with the average block size of 64 KB compressible by 33%. The data blocks were written as 9 original and 3 redundant fragments providing resiliency to 3 failures. If not specified otherwise, we used default resource division policy giving 70% system resources to user operations (reads and writes) and 30% to deletion-related tasks in all experiments.

(Read/Write Bandwidth)

This experiment measures the impact of garbage identification on performance of user writes and reads. For writes, we measured this impact as a function of dedup ratio of the data written. We collected 15 data points in total, in groups of 3 for each of 5 values of dedup ratio varying from 0% up to almost 100% with a step of 25%. The first measurement in each group measures write bandwidth with a given dedup ratio when no deletion is running. The second and the third data points were collected with the same base scenario: first, we filled an empty system with 4TB of non duplicated data and performed deletion to compute block counters. Next, we loaded 400 GB of new data and deleted 400 GB of existing data. The difference between these two data points is the resource division policy used: the second one uses the resource division policy giving 100% to writes, whereas the third one uses the default resource division policy reserves 30% of resources to deletion.

For reads, we performed three similar experiments, but instead of writing data, we tested reading of some continuous fragments of data loaded at the beginning. We used two ANs and wrote many streams in each experiment to make sure the bottleneck is not on the client side.

Figure 5:
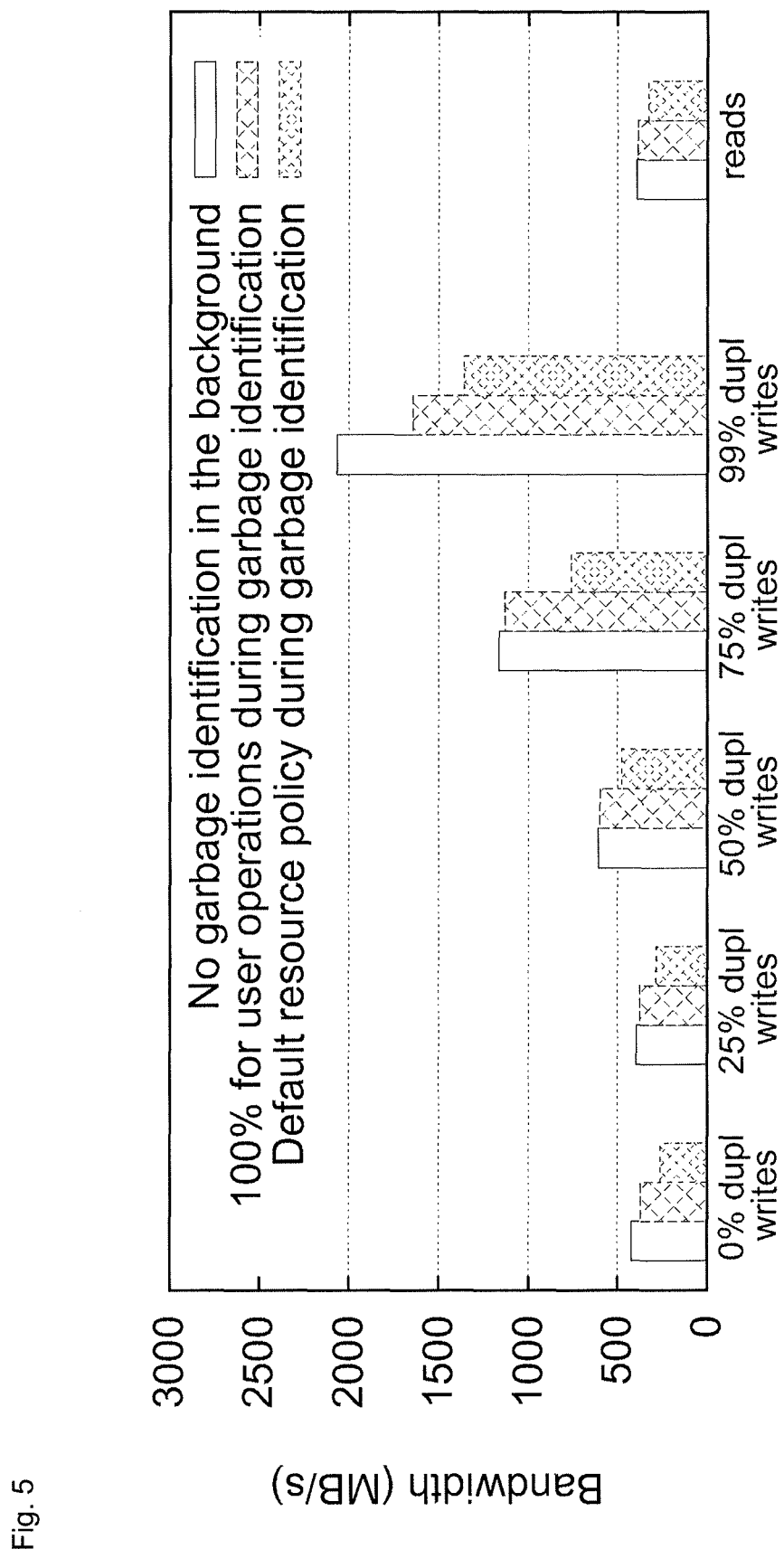
FIG. 5 is a graph showing user operations bandwidths according to the first exemplary embodiment.

The results in FIG. 5 4 show that the bandwidth of writes drops most significantly for highly duplicated streams. In such case, CPU is a bottleneck and the garbage identification process requires substantial CPU cycles, for example, for writing undelete markers. For less deduplicated streams, performance of writes matches the resource division policy set.

The impact of deletion on reads is even smaller than on writes. This is because the reading procedure in the storage system of the present invention focuses on small read latency at bandwidth's expense, so reading does not fully utilize CPU and disk resources. As a result, deletion needs can still be accommodated without big impact on read latency.

(Garbage Identification Duration)

Figure 6:
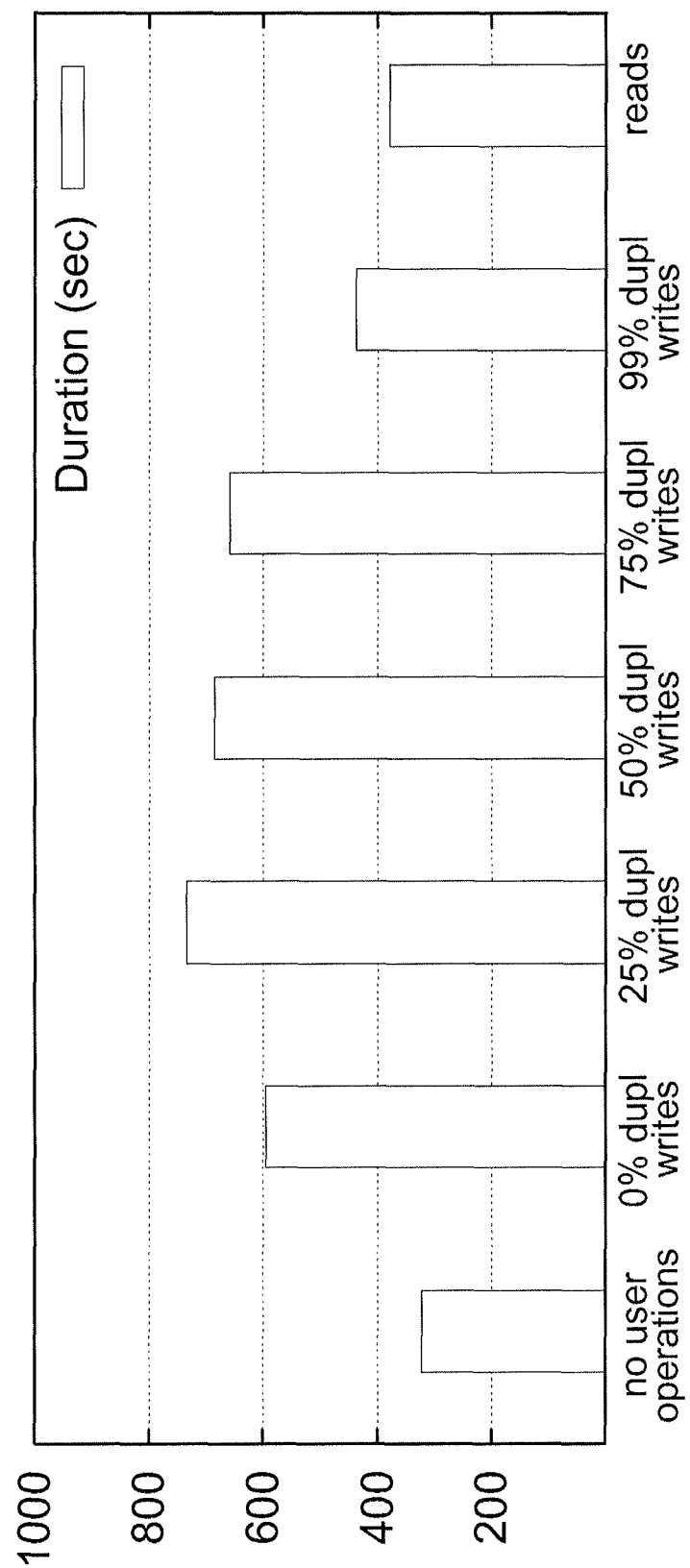
FIG. 6 is a graph showing measurements of garbage identification durations while user operations are in progress according to the first exemplary embodiment.

While executing experiments described above, we additionally measured the duration of garbage identification. Results for the case with the default resource division policy are given in FIG. 6. We measured the duration of the garbage identification of the second deletion run.

For deletion duration, the disks are the bottleneck. Since disks are used intensively by non-duplicate writes, the deletion duration takes the longest when such writes are present. During reads, not all disks are used because small read latency is required; as a result, deletion duration during reads is short. The highest deletion need for CPU cycles is when setting undelete markers for duplicated writes. With the default resource division policy, the deletion gets enough CPU cycles, but this results in lower write performance, as explained above.

(Garbage Reclamation)

Figure 7:
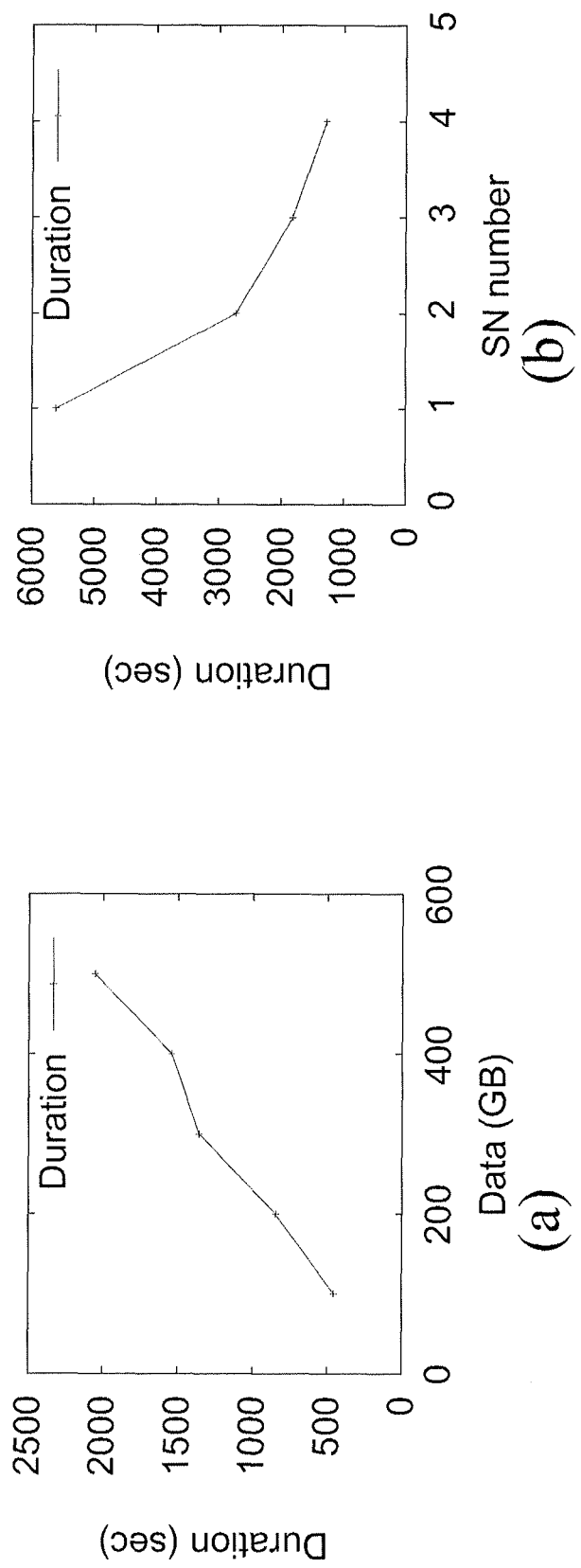
FIGS. 7(*a*) and 7(*b*) are graphs indicating measurements of a garbage reclamation duration and a garbage identification duration according to the first exemplary embodiment.

In each of the 5 experiments measuring the duration of garbage reclamation, we wrote 500 GB of data and deleted 50 GB of it, but varied amount of data to be rewritten for the reclamation to finish. FIG. 7(a) shows almost linear relation between garbage reclamation duration and the amount of data to be rewritten. This is because the duration of garbage reclamation is proportional to the number of containers keeping blocks with counters equal zero. As described above, containers with such blocks must be rewritten during space reclamation. Rewriting containers is a heavy operation, so as expected, the more containers to rewrite, the longer duration of space reclamation is.

(Deletion Scalability)

The experiments to investigate deletion scalability have been performed using a systems with 1 to 4 SNs. We have filled the system with 4TB of non duplicated data, marked 5% of it for removal, and started deletion. FIG. 7(b) shows that two node garbage identification is almost twice as fast as single node, adding more nodes beyond 2 still reduces this phase almost linearly, but less steeply. Adding nodes reduces deletion duration because the work to be done by deletion does not change with more nodes and it is distributed among all nodes.

(Performance of Deletion after Node Failure)

We performed 3 experiments to measure how node failure affects identification duration. In each, we used 4 SNs at the beginning, filled the system with 2TB of non duplicated data, and marked 5% of it for removal. During the first experiment, we just performed garbage identification. During the second one, we shut down one of SNs, started garbage identification, waited until good peers are chosen and restarted the SN which had been shut down. During the third experiment, we shut down one of the SNs just before garbage identification was started. In each experiment, we have measured the duration of the period starting from choosing good peers to the end of garbage identification.

Figure 8:
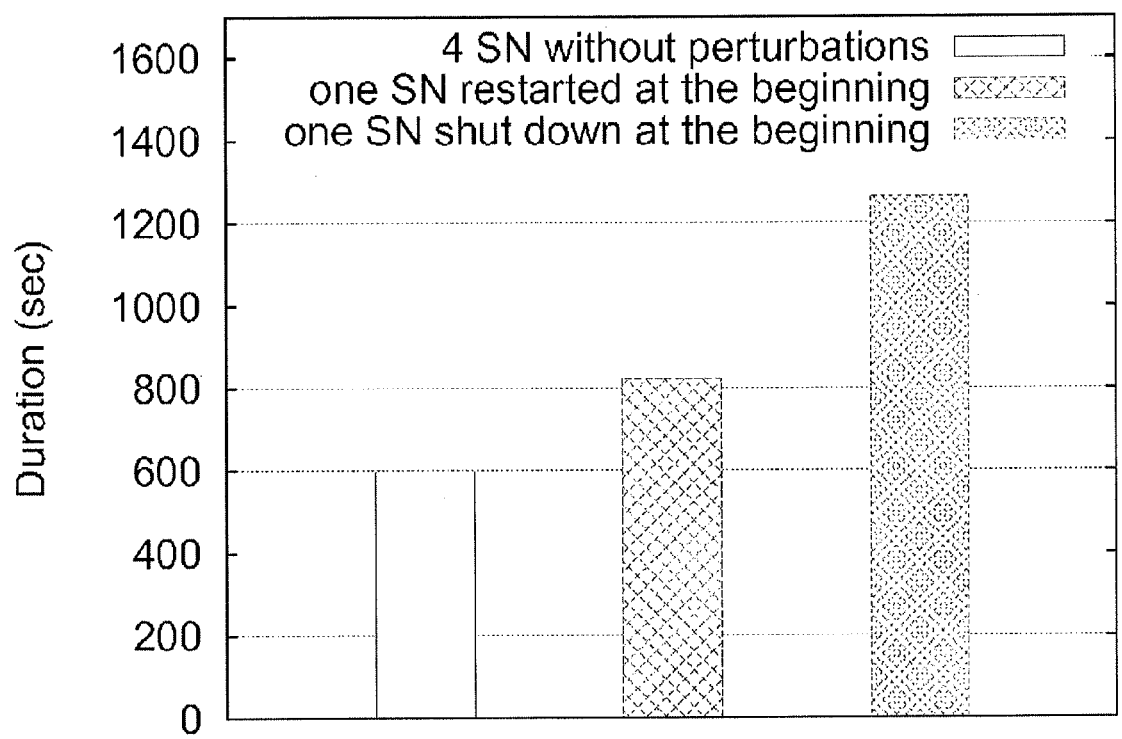
FIG. 8 is a graph indicating measurements of garbage identification duration when a problem is caused in a storage node according to the first exemplary embodiment.

The results are shown in FIG. 8. The second duration is larger because one of SNs was restarted after the selection of good peers and this node didn't take part in garbage identification. So the work to do during identification was divided between only 3 SNs instead of 4. The third duration is much longer than the second one, because the background tasks which are needed to reconstruct data are executed during the whole garbage identification. Note that if the failure occurs in the middle of the identification, the process will manage to finish and its duration will be not longer than the one presented in the third experiment.

(Related Work)

The implemented deletion in the present invention bears some resemblance to concurrent garbage collection in programming languages with dynamic data structures which is well-understood (NPL 2, 3). However, there are significant differences. On the one hand, the deletion in the present invention is more complicated because of deduplication, scalability and failure tolerance of the content-addressable storage system; on the other hand, the deletion is simplified because the graphs of blocks must be acyclic which is not true for programming language garbage collection.

The deletion in the present invention is based on deferred reference counting (NPL 2). Alternatively, we could have used mark and sweep (NPL 4) to implement our deletion. We decided against it to avoid traversing all data on each deletion. Grouped mark and sweep (NPL 5) attempts to solve this problem by grouping backups and sweeping only those containers which keep objects from groups with some files deleted since the previous run of the algorithm. Since dedup ratio in backup data is high, removal of one old backup may result in sweeping of many containers with shared data even though there may be little data to be reclaimed; whereas with the reference counting this is not the case.

The undelete markers used in the present invention are in a way similar to graying of a white object on read in the tricolor mark-and-sweep scheme (NPL 2).

Without deduplication, deletion in a distributed storage system is relatively simple and can be done with leases like in Glacier (NPL 6), or with simple reclamation of obsolete versions like in Ursa Minor (NPL 7). However, with deduplication, deletion becomes difficult for reasons explained earlier. For example, Venti (NPL 8), Deep Store (NPL 9), and Sparse Indexing (NPL 10) have not implemented deletion. Another class of systems implements garbage collection on their storage units in a disruptive manner. MAD2 (NPL 11) reference-counts fingerprints but freezes all involved tankers during physical deletion period. DDE (NPL 12) revokes all data locks held by clients to free dereferenced blocks. dedupv1 (NPL 13, 14) in background marks unreferenced blocks as "garbage collecting candidates" but commits their removal only if the system is idle. Other works include: usage of back-pointers (reference lists) in SIS (NPL 15) and in FARSITE(NPL 16); collecting of unused blocks during exclusive scanning of a part of global hash index updated out-of-band in DeDe (NPL 17).

Data Domain (PTL 1, 2, NPL 18) delivers a garbage collection procedure in a centralized system with inline deduplication. Selection of blocks for removal is done using Bloom filter which results in some garbage remaining in the system. EMC Centera (PTL 3, NPL 19, 20) delivers explicit deletion of a content unit but does not mention how concurrent deletion and deduplication is handled, Extreme Binning (NPL 21) localizes their deduplication within bins and claims this easies garbage collection although no details are given.

(Conclusions and Future Work)

The deletion algorithm for a scalable storage with deduplication has been described. The deletion of the present invention has been implemented and deployed in a content-addressable storage system which is a commercial system. The algorithm is nondisruptive, i.e. allows for deletion to proceed with user reads and writes. Moreover, it addresses other critical functional requirements such as high availability, small performance impact on user operations and resiliency to multiple disk, node or network failures as well as configuration changes resulting from system growth. The influence of the deletion on overall performance scales well in terms of changing computation power or disks capacity.

Continuous availability is achieved through the mechanism of epochs creating boundary between old and newly written data, because a quiescent point is set and reading and writing can be performed during counter computation. Thus, ongoing backups are not influenced by the deletion process running in the background. In fact, epoch introduction is essential for defining clear semantics for non-disruptive deletion process.

Performance impact, in turn, is small because operations of the deletion are performed in batches and they are distributed over the entire network. Importantly, undelete markers are kept in the main memory which results in a low overhead of marker handling on user writes.

Failure tolerance is achieved by redundancy of computation associated with good peers. Selected peers perform critical computations redundantly allowing deletion process to proceed even if several of them crash. Good peers are also responsible for deletion procedures scalability to secure scalability of the performance according to the system size. Deletion scalability is ensured by associating deletion work with each supernode, without having any centralized component.

Although deletion is fully functional today, important features could still improve its value for the end user. Since deletion procedure is non-disruptive, most improvements involve ensuring further performance boosts. One of potential improvements is an introduction of separate containers for blocks with pointers which may speed up the counter incrementation phase. Apart from improving performance, other directions for future work include making the deletion restartable by checkpointing intermediate deletion results.

<Second Exemplary Embodiment>

Figure 9:
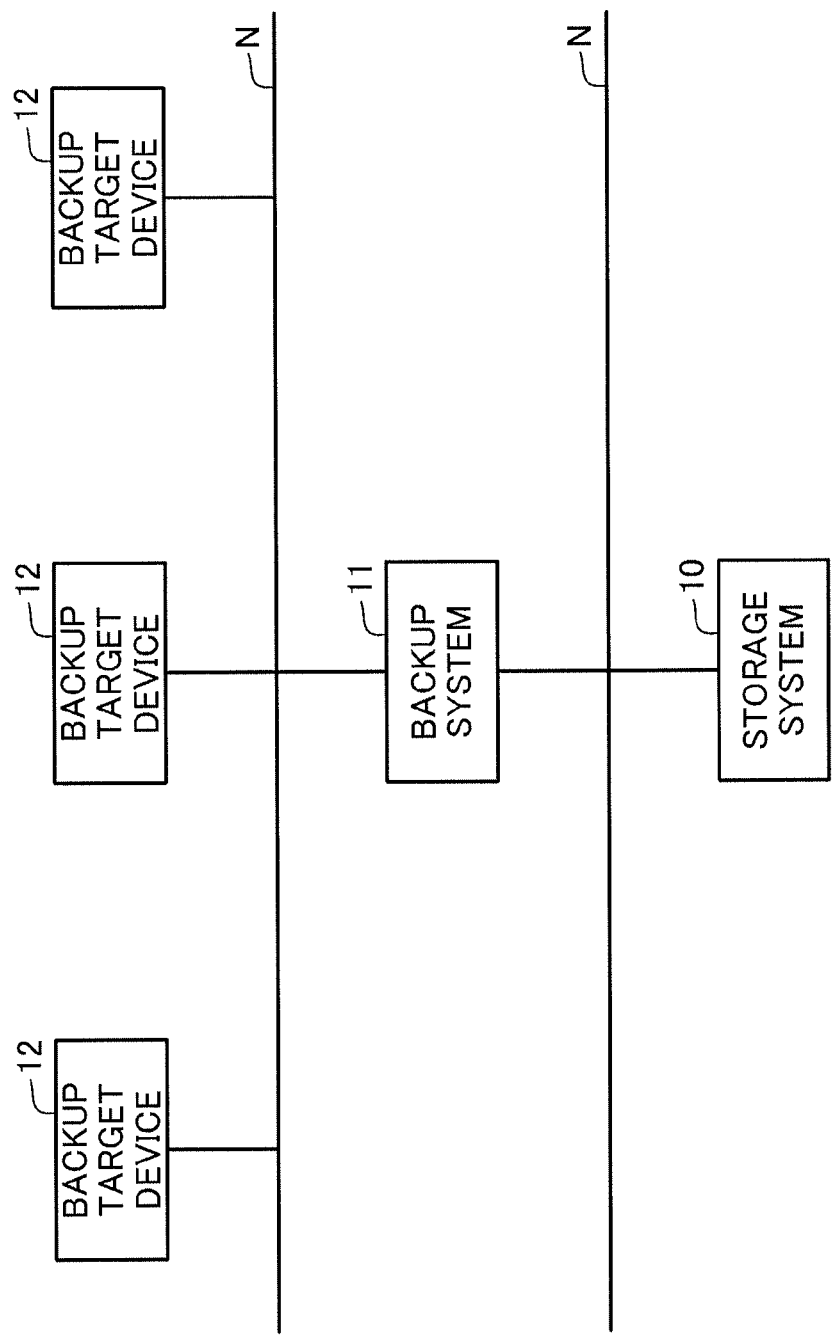
FIG. 9 is a block diagram showing a configuration of a whole system including a storage system of a second exemplary embodiment.
Figure 10:
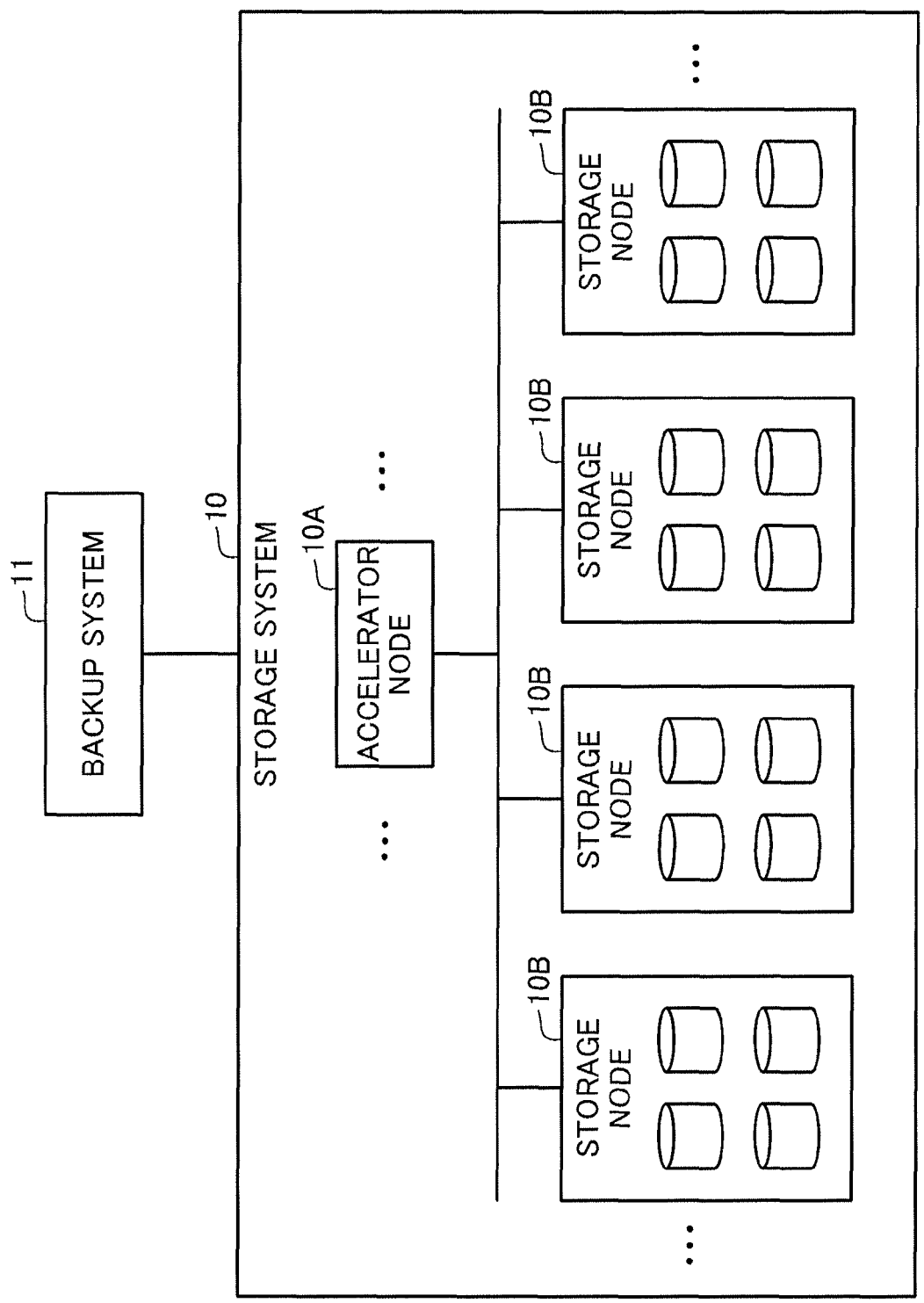
FIG. 10 is a block diagram schematically showing a configuration of the storage system of the second exemplary embodiment.
Figure 11:
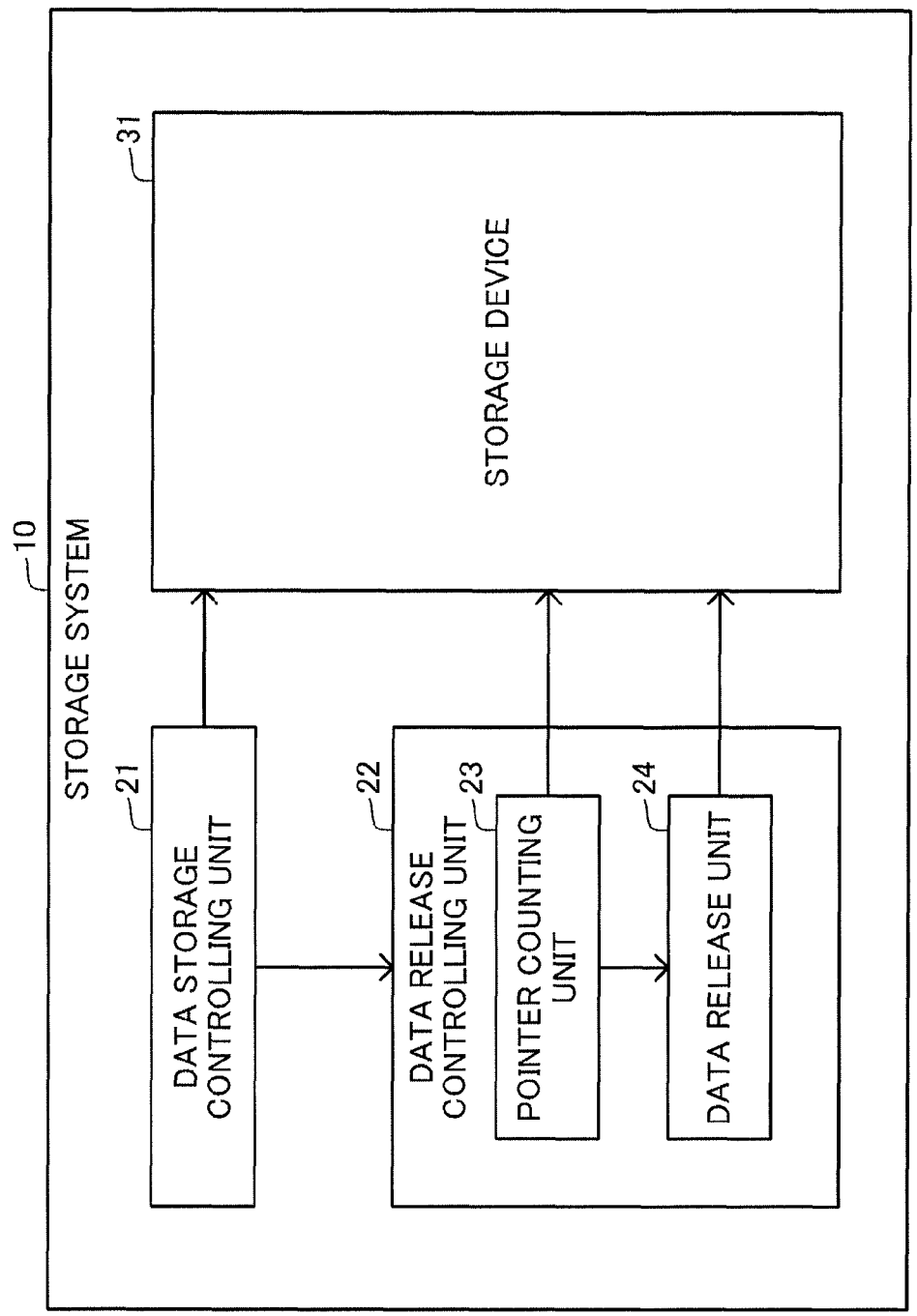
FIG. 11 is a function block diagram showing the configuration of the storage system of the second exemplary embodiment.

A second exemplary embodiment of the present invention will be described with reference to FIGS. 9 to 20. FIG. 9 is a block diagram showing a configuration of a whole system. FIG. 10 is a block diagram schematically showing a storage system, and FIG. 11 is a function block diagram showing the configuration. FIGS. 12 to 20 are explanation views for explaining an operation of a storage system.

This exemplary embodiment herein shows a case that the storage system is configured by connecting a plurality of server computers. However, the storage system of the present invention is not limited to the configuration with a plurality of computers, and may be configured by one computer.

As shown in FIG. 9, a storage system 10 of the present invention is connected to a backup system 11 that controls a backup process via a network N. The backup system 11 acquires backup target data (storage target data) stored in a backup target device 12 connected via the network N, and requests the storage system 10 to store. Thus, the storage system 10 stores the backup target data requested to be stored as a backup.

As shown in FIG. 10, the storage system 10 of this exemplary embodiment employs a configuration that a plurality of server computers are connected. To be specific, the storage system 10 is equipped with an accelerator node 10A serving as a server computer that controls the storing/reproducing operation of the storage system 10, and a storage node 10B serving as a server computer equipped with a storage device that stores data. The number of the accelerator node 10A and the number of the storage node 10B are not limited to those shown in FIG. 10, and a configuration that more nodes 10A and more nodes 10B are connected may be employed.

Further, the storage system 10 of this exemplary embodiment is a content address storage system that divides data and makes the data redundant, distributes the data and stores into a plurality of storage devices, and specifies a storing position in which the data is stored by a unique content address set in accordance with the content of the data to be stored. This content address storage system will be described later.

Assuming the storage system 10 is one system, the configuration and the function of the storage system 10 will be described below. In other words, the configuration and the function of the storage system 10 described below may be included in either the accelerator node 10A or the storage node 10B. The storage system 10 is not limited to the configuration including the accelerator node 10A and the storage node 10B. The storage system 10 may have any configuration and, for example, may be configured by one computer. Moreover, the storage system 10 is not limited to a content address storage system.

FIG. 11 shows a configuration of the storage system 10. As shown in this drawing, the storage system 10 is equipped with a storage device 31 that stores data, and a data storage controlling unit 21 that controls operation of storing and retrieving data into and from the storage device 31, and a data release controlling unit 22 that releases a storage space containing data which is stored in the storage device 31 but has not been used, so as to allow reclamation of the storage space. Actually, the data storage controlling unit 21 and the data release controlling unit 22 are configured by programs installed in a plurality of arithmetic devices such as a CPU (Central Processing Unit) of the accelerator node 10A and a CPU of the storage node 10B shown in FIG. 10. Moreover, the storage device 31 is configured by a hard disk of the accelerator node 10A and a hard disk of the storage node 10B shown in FIG. 10.

The abovementioned program is provided to the storage system 10, for example, in a state stored in a storing medium such as a CD-ROM. Alternatively, the program may be stored in a storage device of another server computer on the network and provided from the other server computer to the storage system 10 via the network.

Hereinafter, the configurations of the data storage controlling unit and the data release controlling unit 22 will be described. First, a content-addressable method of storing and retrieving data by the data storage controlling unit 21 will be described with reference to FIGS. 12 to 14.

Figure 12:
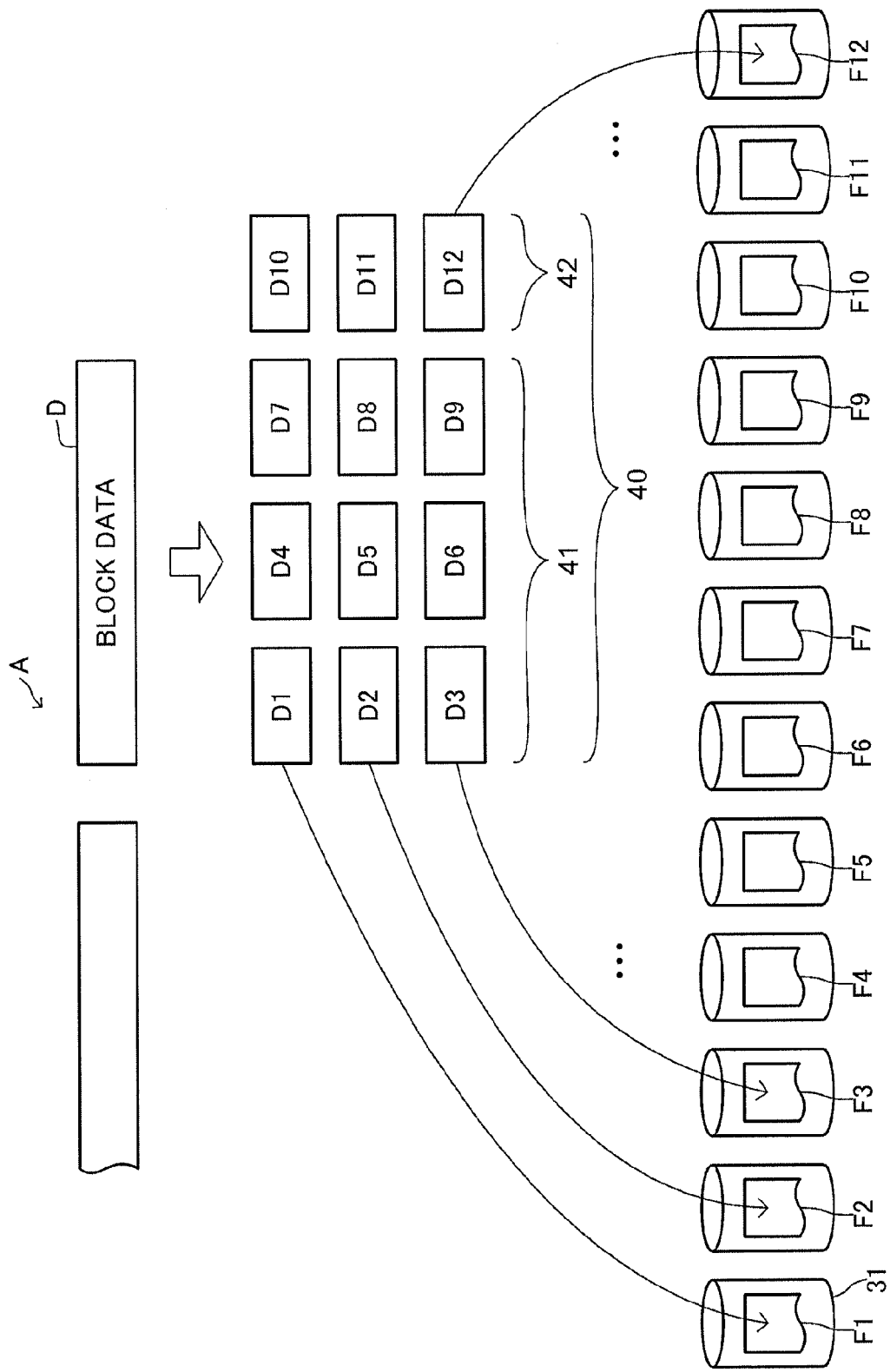
FIG. 12 is an explanation view for explaining an aspect of a data storage process in the storage system disclosed in FIG. 11.
Figure 13:
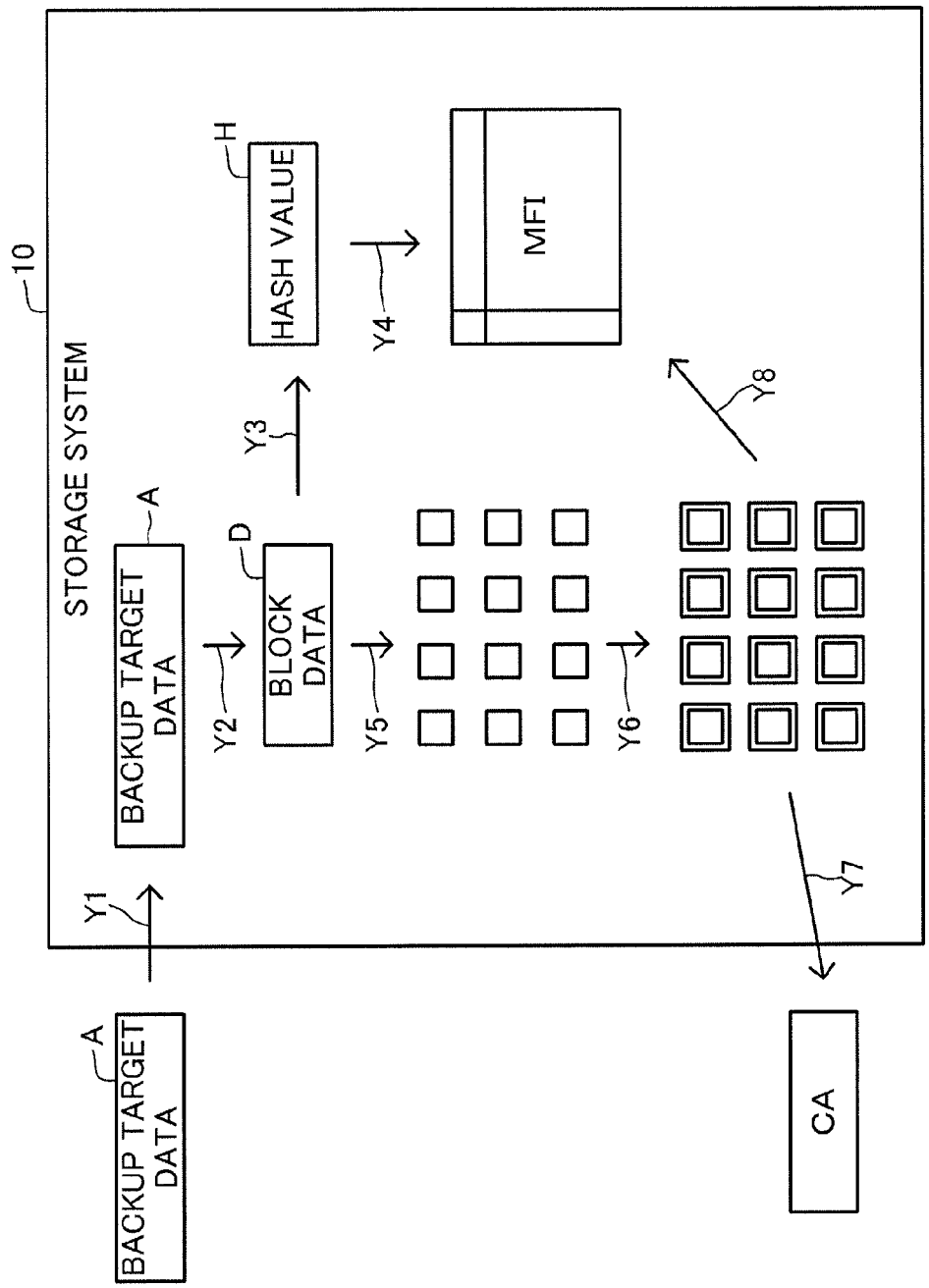
FIG. 13 is an explanation view for explaining the aspect of the data storage process in the storage system disclosed in FIG. 11.

First, when the data storage controlling unit 21 receives an input of the backup target data A as shown in an arrow Y1 in FIG. 13, the data storage controlling unit 21 divides the backup target data A into variable capacities (e.g., an average of 64 KB) or predetermined capacities (e.g., 64KB) of block data D, as shown by an arrow Y2 in FIGS. 12 and 13. Then, based on the data content of this block data D, the data storage controlling unit 21 calculates a unique hash value H (content identification information) representing the data content (arrow Y3). For example, a hash value H is calculated from the data content of the block data D by using a preset hash function. The process by the data storage controlling unit 21 is executed in the accelerator node 10A.

Then, by using the hash value H of the block data D of the backup target data A, the data storage controlling unit 21 checks whether or not the block data D has already been stored in the storage devices 31. To be specific, the hash value H and content address CA that represents the storing position of the block data D having already been stored are related and registered in an MFI (Main Fragment Index) file. Therefore, in a case that the hash value H of the block data D calculated before storage exists in the MFI file, the data storage controlling unit 21 can determine that the block data D having the same content has already been stored (arrow Y4 in FIG. 13). In this case, the data storage controlling unit 21 acquires a content address CA related to a hash value H within the MFI that coincides with the hash value H of the block data D before storage, from the MFI file. Then, the data storage controlling unit 21 stores this content address CA (address data) as the content address CA of the block data D required to be stored. Alternatively, the data storage controlling unit 21 may store another address data further referring to the content address CA referring to the block data D that has already been stored, in a tree structure. Consequently, the already stored data referred to by using this content address CA is used as the block data D required to be stored, and it becomes unnecessary to store the block data D required to be stored.

Further, the data storage controlling unit 21 compresses block data D determined that it has not been stored yet as described above, and divides the data into a plurality of fragment data having predetermined capacities as shown by arrow Y5 in FIG. 13. For example, as shown by reference numerals D1 to D9 in FIG. 12, the data storage controlling unit 21 divides the data into nine fragment data (division data 41). Moreover, the data storage controlling unit 21 generates redundant data so that the original block data can be restored even if some of the fragment data obtained by division are lost, and adds the redundant data to the fragment data 41 obtained by division. For example, as shown by reference numerals D10 to D12 in FIG. 12, the data storage controlling unit 21 adds three fragment data (redundant data 42). Thus, the data storage controlling unit 21 generates a data set 40 including twelve fragment data composed of the nine division data 41 and the three redundant data. The process by the data storage controlling unit 21 is executed by one storage node 10B.

Then, the data storage controlling unit 21 distributes and stores, one by one, the fragment data composing the generated data set into storage regions formed in the storage devices 31. For example, as shown in FIG. 12, in the case where the twelve fragment data D1 to D12 are generated, the data storage controlling unit 21 stores one of the fragment data D1 to D12 into one of data storage files F1 to F12 (data storage regions) formed in the twelve storage devices 31 (refer to arrow Y6 in FIG. 13).

Further, the data storage controlling unit 21 generates and manages a content address CA, which represents the storing positions of the fragment data D1 to D12 stored in the storage devices 31 as described above, that is, the storing position of the block data D to be restored by the fragment data D1 to D12. To be specific, the data storage controlling unit 21 generates a content address CA by combining part (short hash) of a hash value H calculated based on the content of the stored block data D (e.g., the beginning 8 bytes in the hash value H) with information representing a logical storing position. Then, the data storage controlling unit 21 returns this content address CA to a file system within the storage system 10, namely, to the accelerator node 10A (arrow Y7 in FIG. 13). The accelerator node 10A then relates identification information such as the file name of the backup target data with the content address CA and manages them in the file system.

Further, the data storage controlling unit 21 relates the content address CA of the block data D with the hash value H of the block data D, and the respective storage nodes 10B manages them in the MFI file. Thus, the content address CA is related with the information specifying the file, the hash value H and so on, and stored into the storage devices 31 of the accelerator node 10A and the storage nodes 10B.

Furthermore, the data storage controlling unit 21 executes a control of retrieving backup target data stored as described above. For example, when the storage system 10 accepts a retrieval request with a specific file designated (refer to arrow Y11 in FIG. 14), based on the file system, the data storage controlling unit 21 firstly designates a content address CA, which is composed of short hash as part of a hash value corresponding to the file relating to the retrieval request and information of a logical position (refer to arrow Y12 in FIG. 14). Then, the data storage controlling unit 21 checks whether or not the content address CA is registered in the MFI file (refer to arrow 13 in FIG. 14). If the content address CA is not registered, the requested data is not stored, so that the data storage controlling unit 21 returns an error response.

Figure 14:
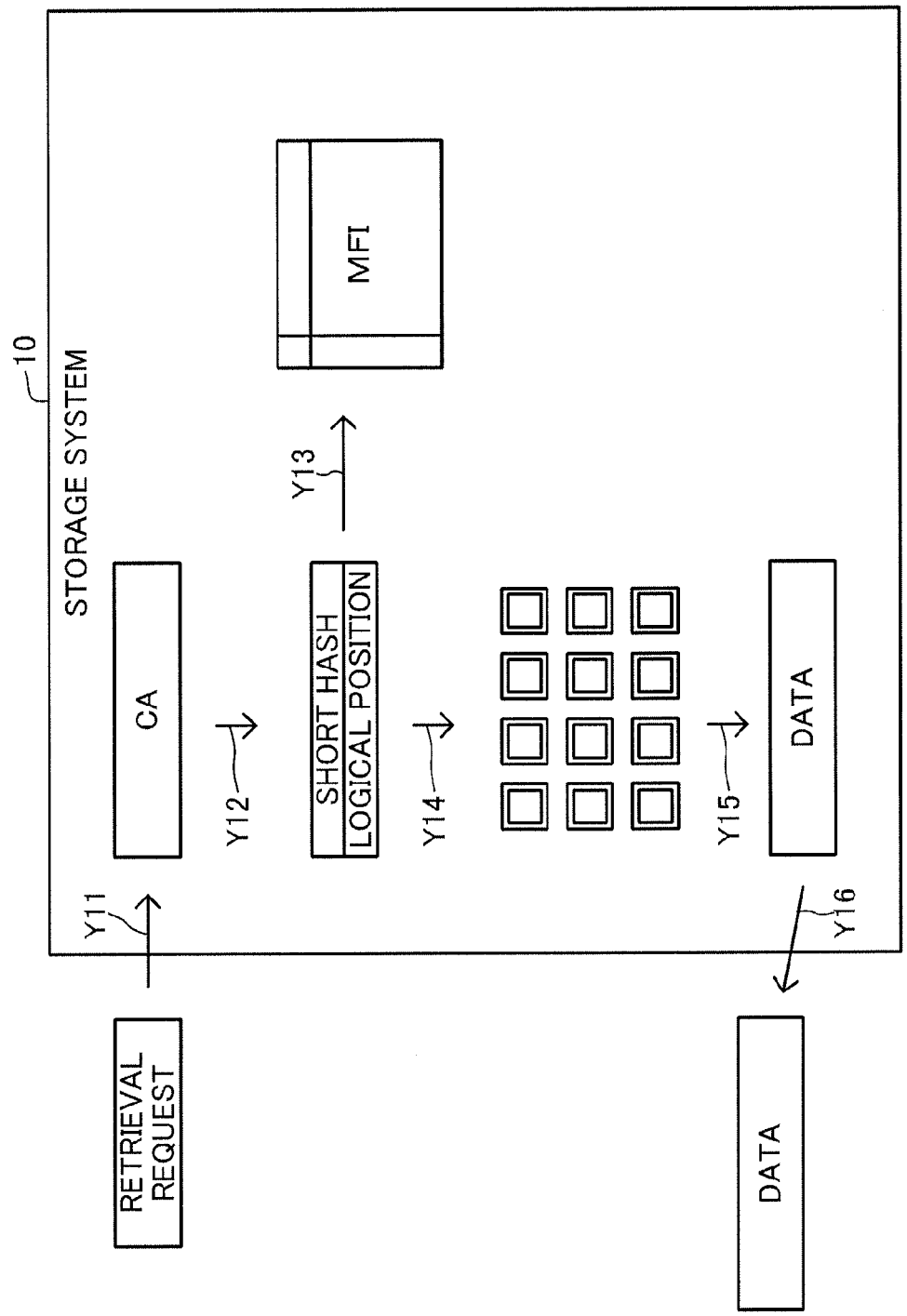
FIG. 14 is an explanation view for explaining an aspect of a data retrieval process in the storage system disclosed in FIG. 11.

On the other hand, if the content address CA relating to the retrieval request is registered, the data storage controlling unit 21 specifies a storing position designated by the content address CA, and retrieves each fragment data stored in the specified storing position as data requested to be retrieved (refer to arrow Y14 in FIG. 14). At this moment, if knowing the data storage files F1 to F12 storing the respective fragments and the storing position of one of the fragment data in the data storage files, the data storage controlling unit 21 can specify the storing positions of the other fragment data because the storing positions are the same.

Then, the data storage controlling unit 21 restores the block data D from the respective fragment data retrieved in response to the retrieval request (refer to arrow Y15 in FIG. 14). Moreover, the data storage controlling unit 21 connects a plurality of restored block data D to restore into a group of data like the file A, and returns to the accelerator node 10A that is controlling the retrieval (refer to arrow Y16 in FIG. 14).

Figure 15:
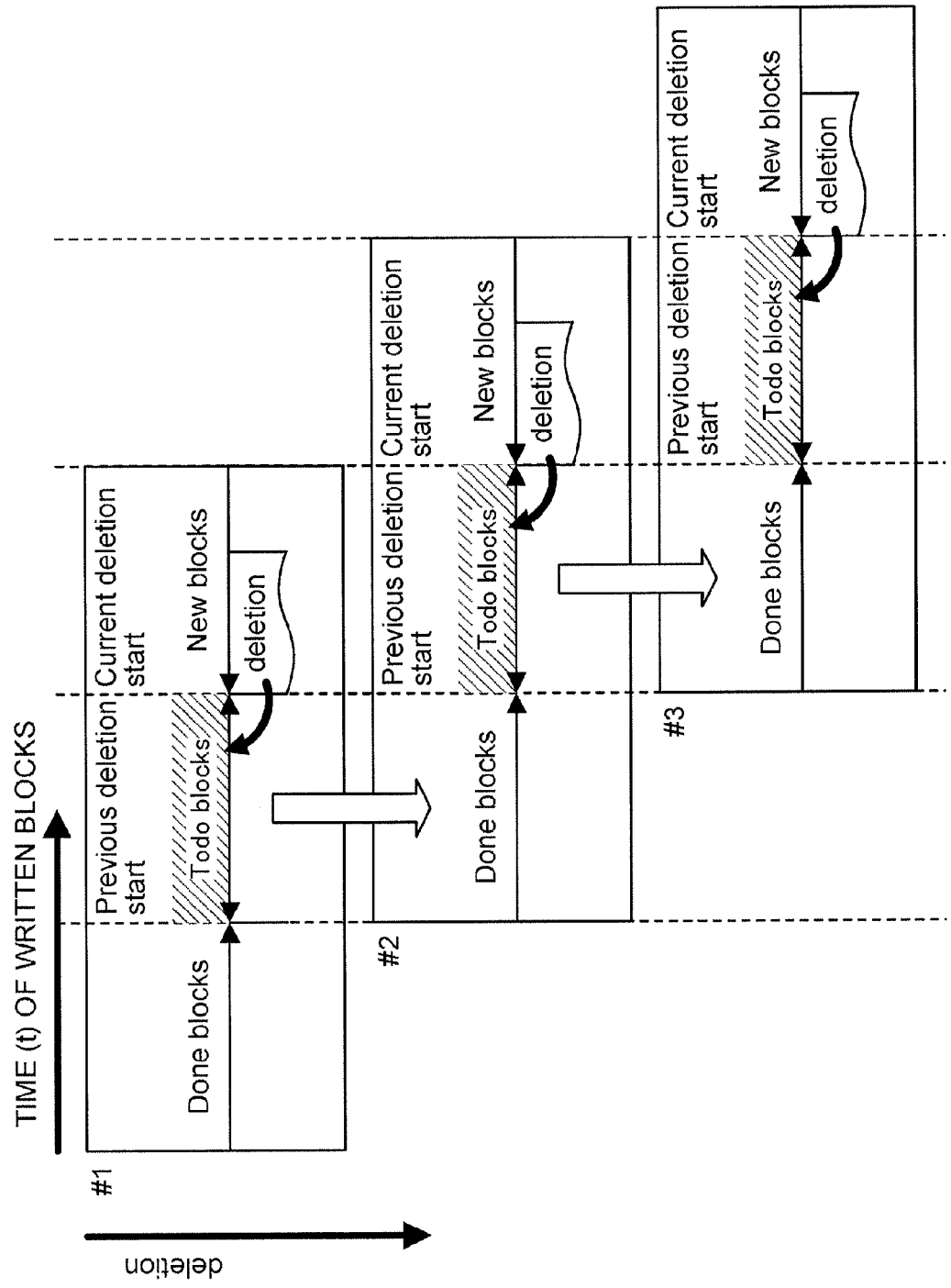
FIG. 15 shows changes in epochs according to the second exemplary embodiment.
Figure 16:
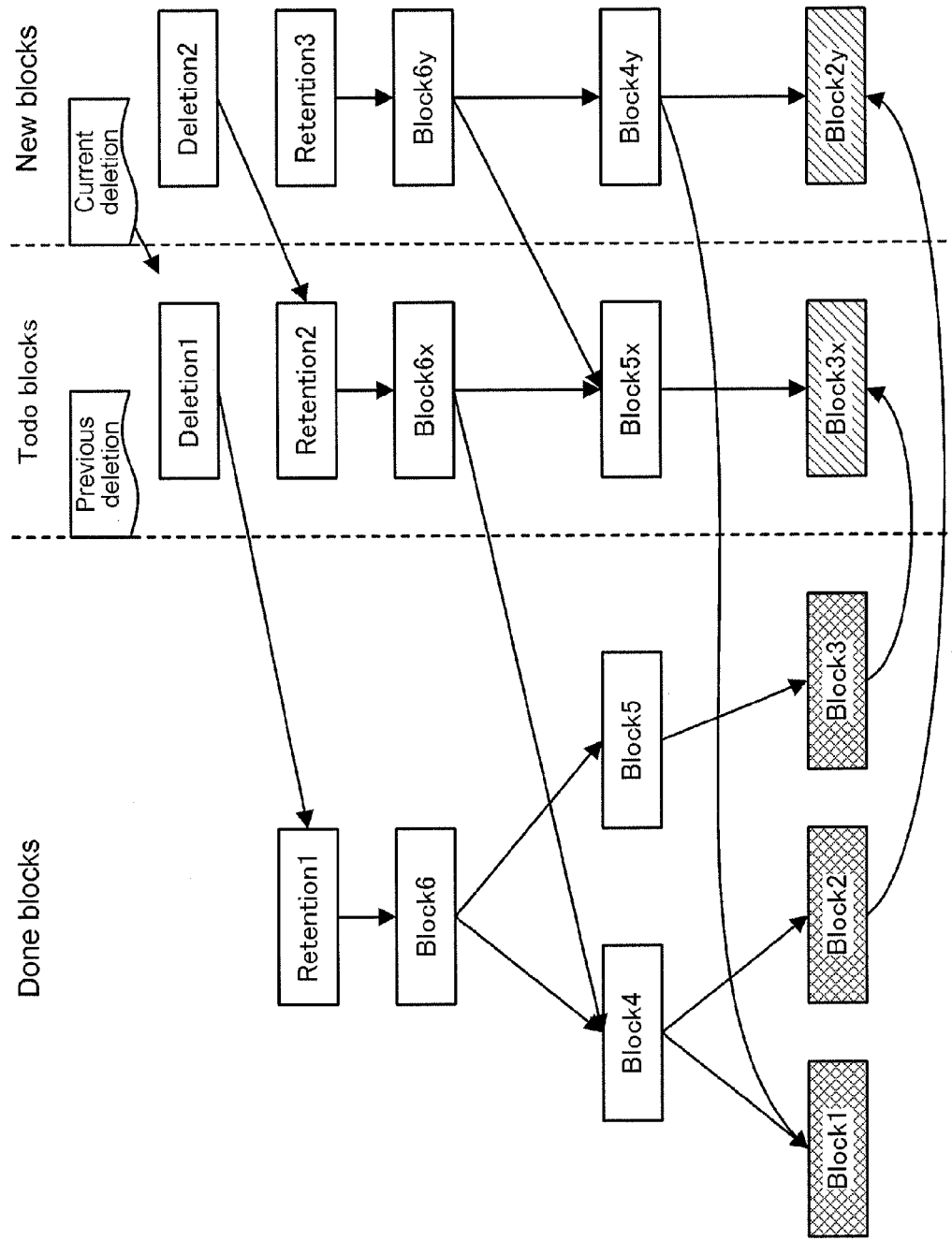
FIG. 16 shows states of written data according to the second exemplary embodiment.
Figure 17:
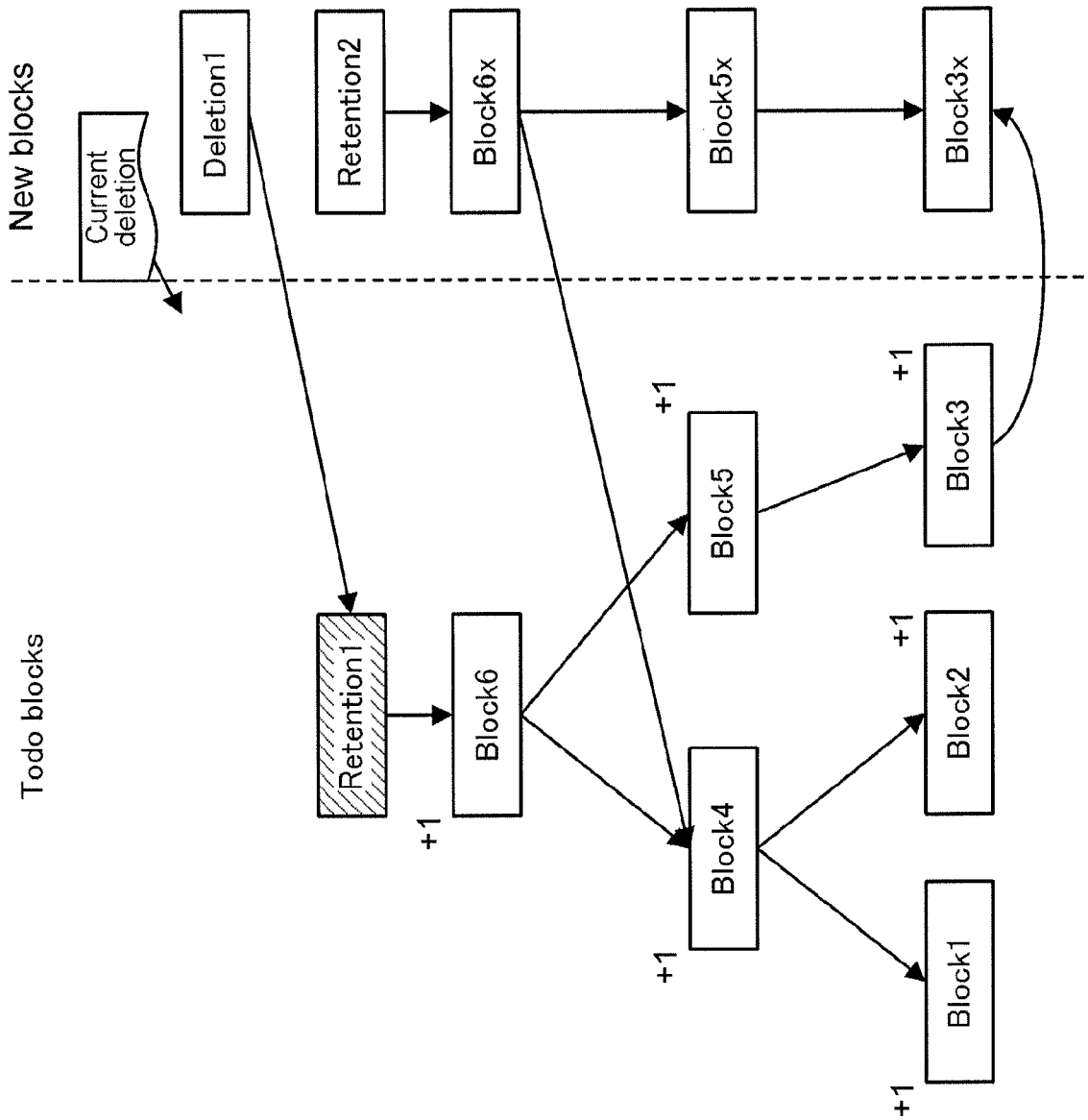
FIG. 17 shows exemplary calculation of the number of written data to be referred to according to the second exemplary embodiment.

The data storage controlling unit 21 stores the storage target data with respect to each time zone divided in a time-series manner in the storage device 31, as described above. Specifically, as shown in FIG. 15 or 16, each time a predetermined period has elapsed, the data storage controlling unit 21 sets an "epoch" indicating the time zone to perform a writing process of new storage target data. At this time, in order to distinguish the epoch of the data written in the storage device 31, the block data is stored with information identifying the epoch. Alternatively, it is also possible to manage the epoch by separately storing identification information of the epoch when the block data is written, in association with the block data.

Transition of the epoch will be described with reference to FIG. 16. If the current writing target epoch is assumed to be a "new block epoch", the previous epoch is a "todo block epoch", and an epoch before it is a "done block epoch". In turn, as shown in FIG. 15, the current "new block epoch" shown by the numeral #1 becomes a "todo block epoch" in the next time zone #2, and the "todo block epoch" in the current time zone #1 becomes a "done block epoch" in the next time zone #2. In this way, as time advances, the epoch changes sequentially. If there is storage target data to be written in the current "new block epoch", the data storage controlling unit 21 is required to complete writing of the storage target data into the storage device 31 within the "new block epoch", that is, before the epoch advances to the next epoch.

For example, as shown in FIG. 16, the data storage controlling unit 21 stores and retains storage target data composed of "Block 1", "Block 2", and "Block 3" in the "done block epoch", which are sequentially pointed to from "Block 6" to "Block 4" and "Block 5". These pieces of newly retained block data are pointed to by the block "Retention 1" indicating that they are retained blocks. It should be noted that "Block 4", "Block 5", and "Block 6" are address data, and "Block 1", "Block 2", and "Block 3" shown by hatching in FIG. 16 are real data, for example.

Then, in the "todo block epoch" which is the next epoch, if the block data "Block 3" constituting "Block 6" is changed to "Block 3x", the new block data "Block 3x" (shown by diagonal lines in FIG. 16), and "Block 5x" and "Block 6x" pointing thereto, are stored in the "todo block epoch". This means that in the "todo block epoch", block data composed of "Block 1", "Block 2", and "Block 3x", which are sequentially pointed to from "Block 6x", instead of "Block 6", to "Block 4" and "Block 5", is stored. However, regarding "Block 1", and "Block 2", the block data which has already been stored in the storage device 31 is pointed to. At this time, because block data to be pointed to by "Block 6x" is newly stored, "Block 6x" is pointed to by the block "Retention 2" indicating that the block is retained. Further, as "Block 6" changed to "Block 6x" is deleted, it is pointed to by the block "Deletion 1" indicating that the block is deleted.

Further, when the epoch advances to the "new block epoch", which is the next epoch, in a similar manner as described above and if the block data "Block 2" constituting "Block 6x" is changed to "Block 2y", the new block data "Block 2y" (shown by diagonal lines in FIG. 16) and blocks "Block 4y" and "Block 6y", pointing thereto, are stored in the "new block epoch". This means that in the "new block epoch", the block data composed of "Block 1", "Block 2y", and "Block 3x", sequentially pointed to from "Block 6y", instead of "Block 6x", to "Block 4y" and "Block 5x", is stored. However, regarding "Block 1", the block data which has been stored in the storage device 31 is pointed to. At this time, because block data to be pointed to by "Block 6y" is newly retained, "Block 6y" is pointed to by the block "Retention 2" indicating that the block is retained. Further, as "Block 6x" changed to "Block 6y" is deleted, it is pointed to by the block "Deletion 2" indicating that the block is deleted.

Next, the data release controlling unit 22 will be described. As shown in FIG. 11, the data release controlling unit 22 includes a pointer counting unit 23 and a data release unit 24, which perform the following processes, respectively.

Each time the "epoch" changes, that is, each time the epoch advances to a current "new block epoch", the pointer counting unit 23 deletes, among pieces of data written in the storage device 31 in the past epochs, pieces of storage target data or address data which are not pointed to from other address data, and performs a "deletion process" for releasing a storage region where such a piece of data is stored in the storage device.

Specifically, with respect to the data (hereinafter referred to as block data) written during the "todo block epoch" which is the previous epoch of the current "new block epoch", the pointer counting unit 23 counts "the number of pointers" indicating the number of pointers from other address data. Counting of the number of pointers is performed such that for block data located on the root pointed by the "Retention" block, the count is "+1", and for block data located on the root pointed by the "Deletion" block, the count is "−1". For example, in the case of FIG. 17, the number of pointers of each block data within the "todo block epoch", which is the last epoch before the current "new block epoch", is counted. However, as only writes of "Retention 1" within the "todo block epoch" have been fixed, the number of pointers of the respective block data "Block 1" to "Block 6" pointed by "Retention 1" becomes "+1". Then, when time has elapsed and the epoch advances to the next epoch as in the case of FIG. 18, the number of pointers of each block data pointed from "Retention 1" and "Deletion 1", fixed in the "todo block epoch" which is the last epoch before the "new block epoch", are incremented or decremented. As such, the number of pointers of "Block 3", "Block 5", and "Block 6", enclosed by a dotted line, becomes "0". Thereby, as the number of pointers of block data which has not been pointed to by any address data becomes "0", it is easy to detect such block data.

Then, at the end of the "deletion process" performed in the "new block epoch", or at given intervals of time, the data release unit 24 deletes the block data with number of pointers being "0" from the storage device 31. At this time, the data release unit 24 releases the storage region, where the deleted block data was stored, in the storage device 31. This means that the data release unit 24 not only prevents reading of the block data which has not been pointed to by any address data, but also releases the storage region where such block data has been stored so as to enable reclamation of the storage region. The process of releasing the storage region by the data release unit 24 may be performed at any time.

Figure 18:
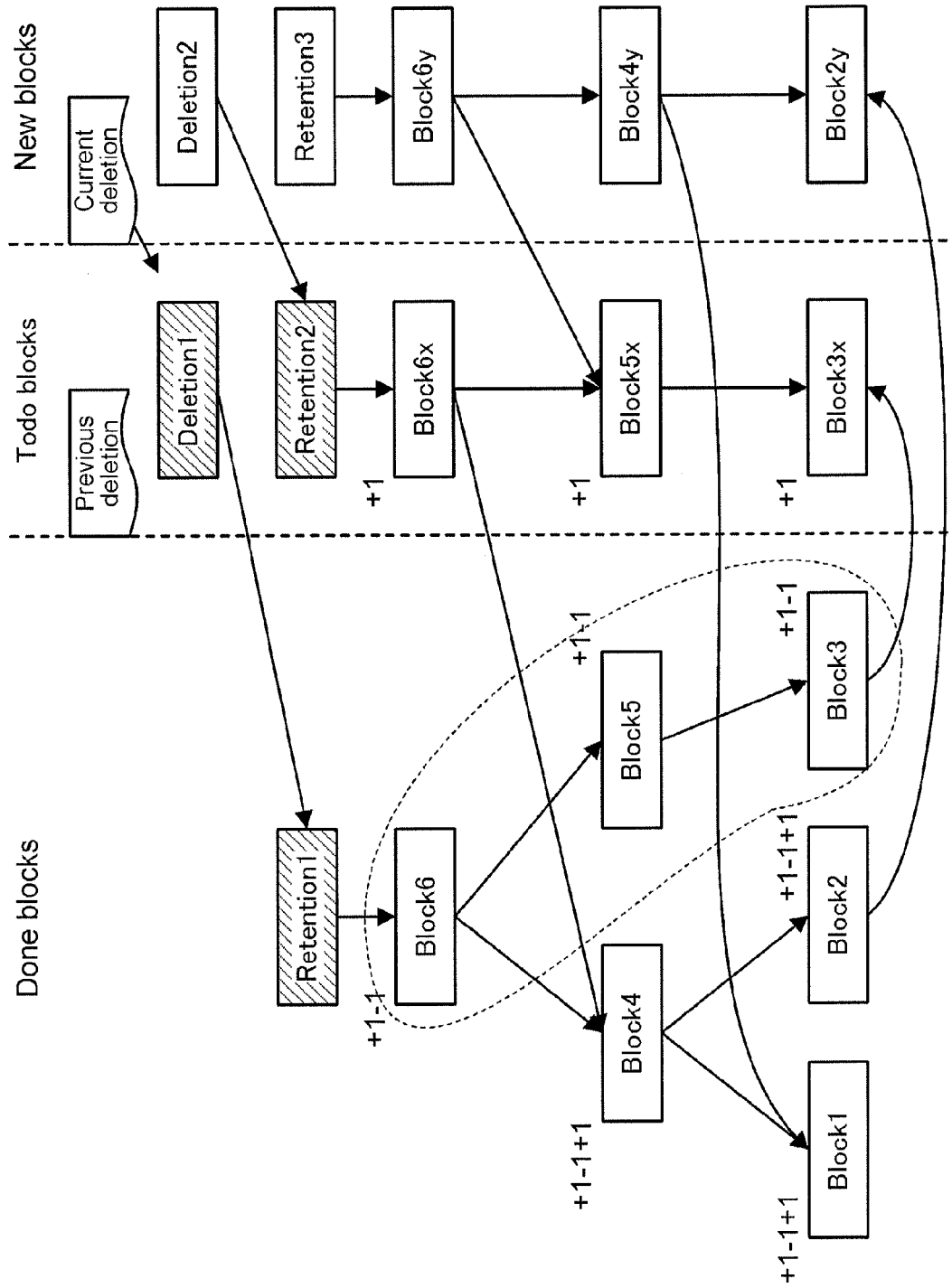
FIG. 18 shows exemplary calculation of the number of written data to be referred to according to the second exemplary embodiment.
Figure 19:
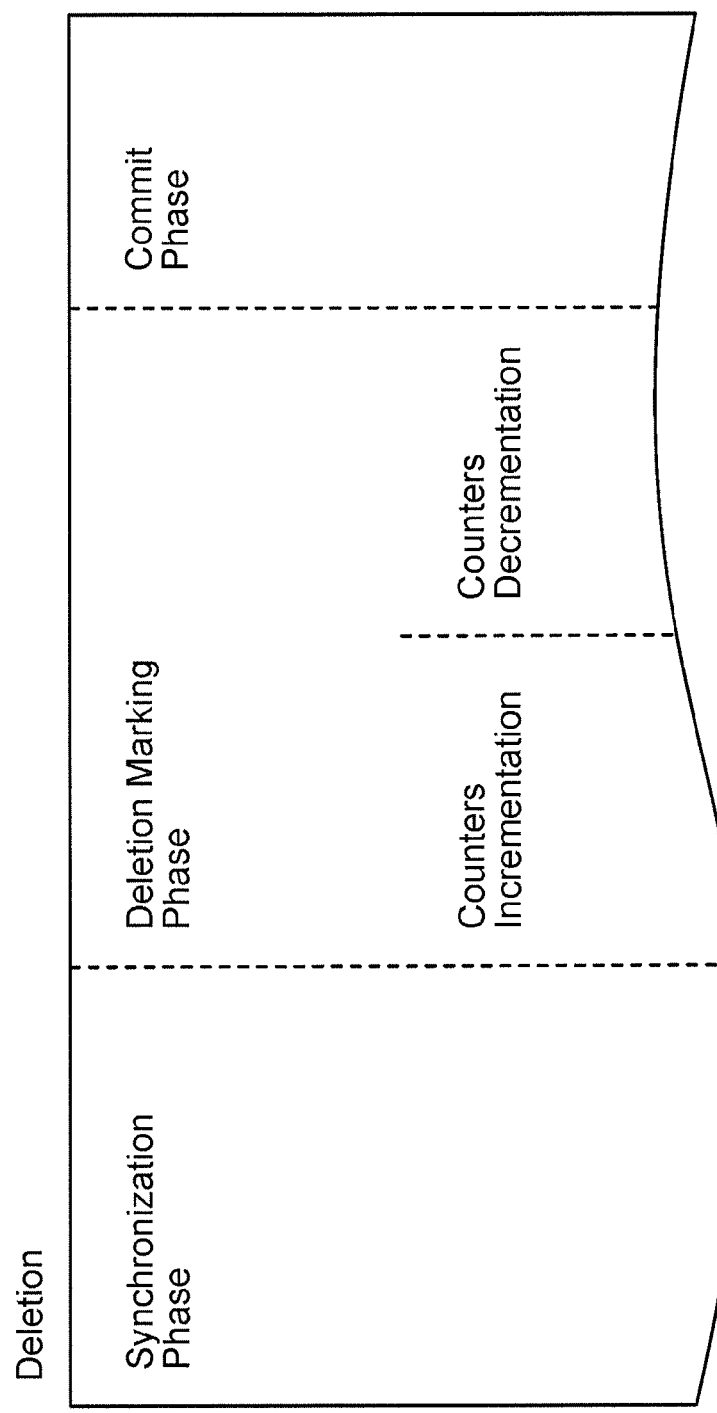
FIG. 19 shows details of a deletion process according to the second exemplary embodiment.

The pointer counting unit 23 performs a deletion process in three phases, including a "synchronization phase", a "deletion marking phase", and a "commit phase", as shown in FIG. 19. In the "synchronization phase", writing of the data written in the storage system 10 into the storage device 31 is completed. This means that, among the pieces of data written in the last epoch, if there is any data which is in the middle of writing, the pointer counting unit 23 writes such data into the storage device 31 to complete a tree structure as shown in FIG. 18.

Then, in the "deletion marking phase", the pointer counting unit 23 performs the process of counting "the number of pointers" of the block data which has been written in the storage device 31. Thereby, as "the number of pointers" can be counted after the tree structure of the block data, that is, pointing relation, is fixed, release of data which is not pointed to can be realized more reliably.

Figure 20:
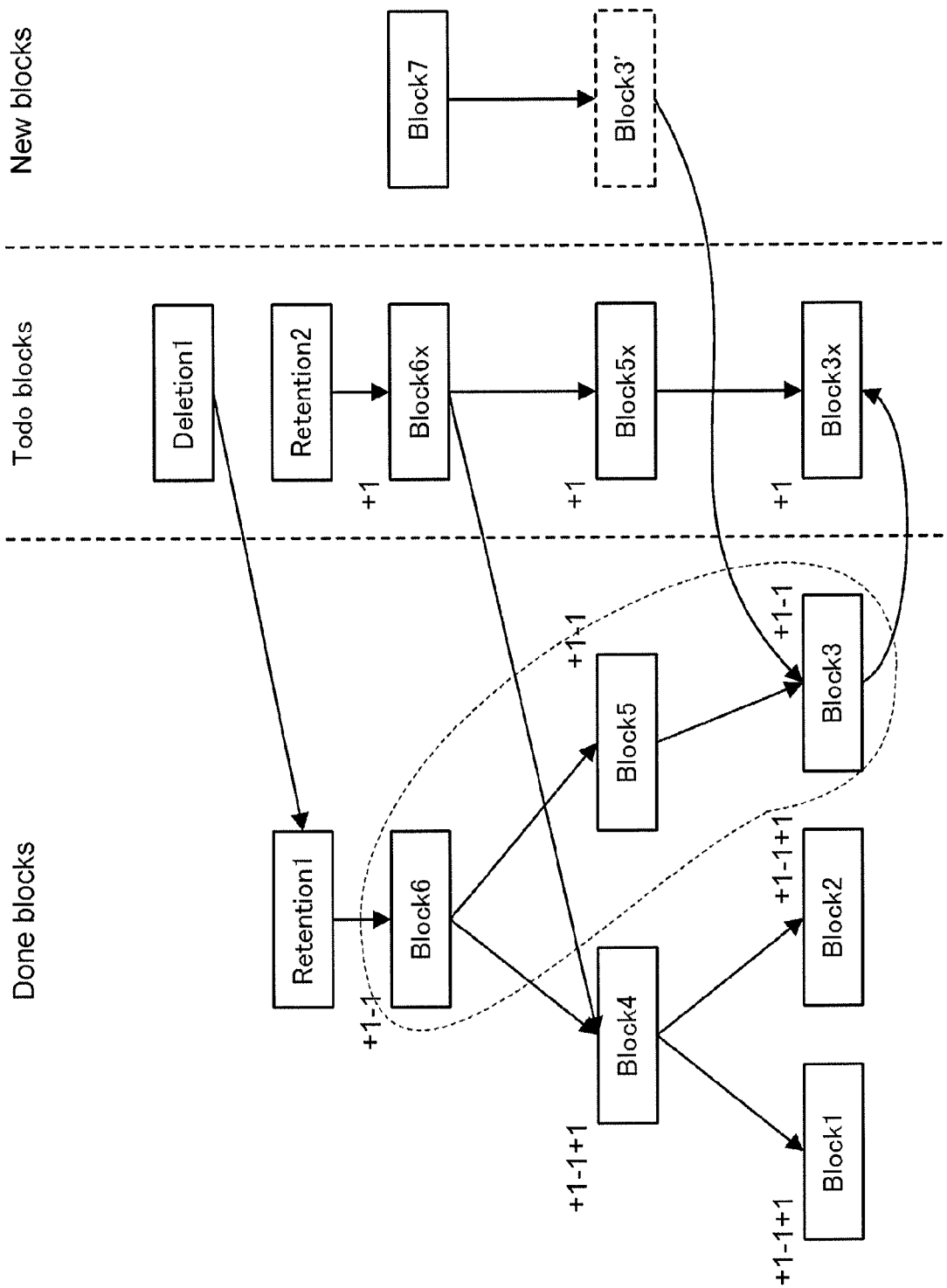
FIG. 20 illustrates problems and their solutions at the time of data deletion according to the second exemplary embodiment.

However, during counting of "the number of pointers" in the "deletion marking phase", there is a case where new data which points to the counting target block data and is to be deduplicated, is written. In that case, "the number of pointers" of the counted block data cannot be fixed, so that newly written data may point to the block data having "the number of pointers" being "0" which may be deleted later. For example, as shown in FIG. 20, if a new write pointing to "Block 3" is generated during the time when "the number of pointers" of "Block 3" is being counted in the "new block epoch", "Block 3" may be deleted later although it is pointed to. In order to prevent such a situation, if a new write is generated when "the number of pointers" of the block data is being counted in the "deletion marking phase" and the new writes points to the block data stored in the past epoch, the pointer counting unit 23 sets a flag called "undelete marker" to such block data. The flag called "undelete marker" is a sign for excluding block data with the flag from the target of release by the data release unit 24. As such, in the example shown in FIG. 20, while "the number of pointers" of the block data "Block 3" is set to be "0" at the time of "new block epoch", as an "undelete marker" is set, it is either deleted nor released. Then, in the next epoch, as the number of pointers of "Block 3" is recounted and it is set to "1", "Block 3"will not be deleted.

Further, in the "commit phase", "the number of pointers" of the block data counted in the "deletion marking phase", is reflected in the system. "The number of pointers" reflected in the system is recognized by the data release unit 24 later, whereby block data having "the number of pointer" being "0" will be deleted and the storage region will be released.

However, during the time when "the number of pointers" is being reflected in the system in the "commit phase", new data pointing to a counted block data and being subjected to deduplication may be written. As such, the new written data may point to block data in which "the number of pointers" is counted to be "0", which would be deleted later. For example, as shown in FIG. 20, if a new write pointing to "Block 3" is generated after "the number of pointers" of "Block 3" has been counted in the "new block epoch", "Block 3" could be deleted later although it is pointed to. In order to prevent such a situation, if a new write is generated during the time when "the number of pointers" of block data is reflected in the "commit phase", the pointer counting unit 23 only allows pointing to block data with "the number of pointers" being a positive value (that is "the number of pointers">0) or block data in which the above-described "undelete marker" is set. Thereby, it is possible to prevent the case where a new write points to block data having a high possibility of being deleted later and deduplication is performed.

Figure 21:
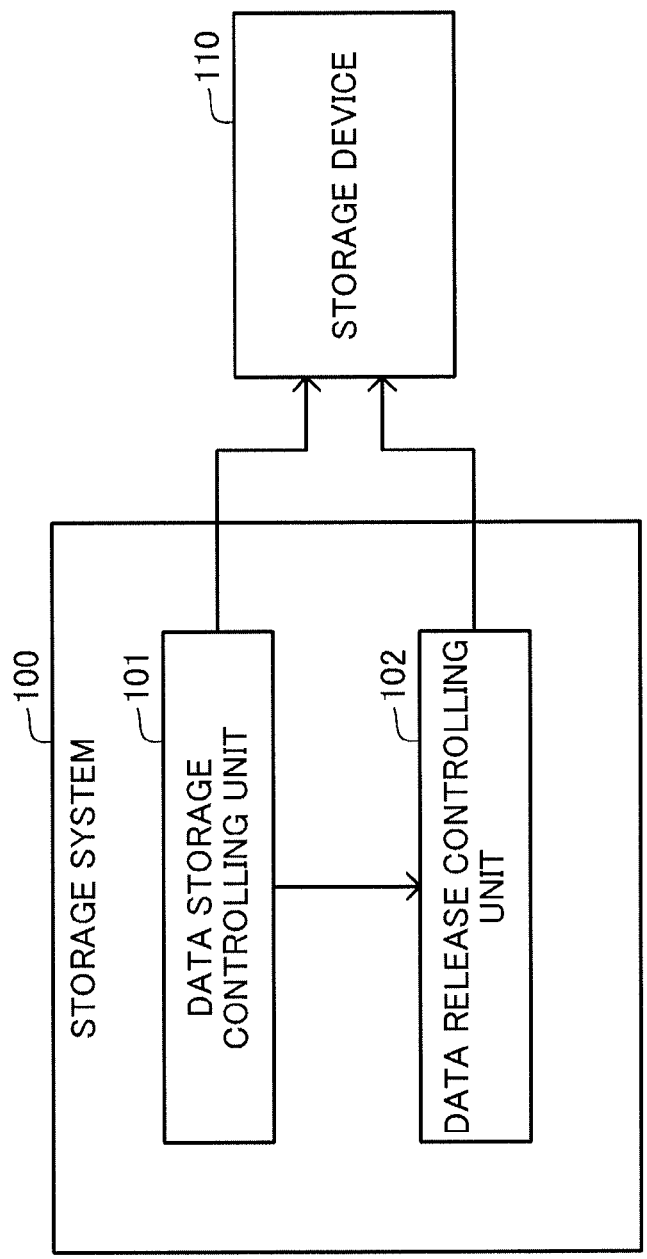
FIG. 21 is a block diagram showing the configuration of a storage system according to Supplementary Note 1.

The whole or part of the exemplary embodiments disclosed above can be described as the following supplementary notes. Outlines of the configurations of a storage system (see FIG. 21), a computer-readable medium storing a program, and an information processing method will be described below. However, the present invention is not limited to the configurations described below.

(Supplementary Note 1)

A storage system, comprising:

a data storage controlling unit 101 that stores storage target data and address data in a storage device 110, the address data being data based on a data content stored in a pointed object and a storage location and pointing to the storage target data or other address data, and when attempting to store, in the storage device 110, another piece of storage target data having a data content identical to a data content of a piece of the storage target data having been stored in the storage device 110, stores, in the storage device 110, the address data pointing to the piece of the storage target data having been stored in the storage device 110 as the other piece of storage target data; and a data release controlling unit 102 that releases a storage region in the storage device 110, the storage region storing a piece of data, which is not pointed to by other address data, of the storage target data or the address data stored in the storage device 110, wherein the data storage controlling unit 101 stores the storage target data or the address data in the storage device 110 with respect to each time zone divided in a time-series manner, and the data release controlling unit 102 releases a storage region in the storage device, the storage region storing a piece of data, which is not pointed to by other address data, of the storage target data or the address data stored in the storage device 110 in a past time zone before a current time zone.

(Supplementary Note 2)

The storage system, according to supplementary note 1, wherein the data release controlling unit counts the number of pointers from other address data of the storage target data or the address data, and releases a storage region, in the storage device, storing a piece of data in which the number of pointers is "0" of the storage target data or the address data.

(Supplementary Note 3)

The storage system, according to supplementary note 2, wherein the data release controlling unit counts the number of pointers of the storage target data or the address data written in a last time zone or earlier before the current time zone.

(Supplementary Note 4)

The storage system, according to supplementary note 3, wherein the data release controlling unit counts the number of pointers after the data storage controlling unit completes storage, in the storage device, of the storage target data or the address data written in the last time zone.

(Supplementary Note 5)

The storage system, according to supplementary note 2, wherein in a case where a new write pointing to the storage target data or the address data stored in the storage device in a past time zone is generated when the data release controlling unit is counting the number of pointers of the storage target data or the address data, the data storage controlling unit sets to exclude the storage target data or the address data stored in the storage device in the past time zone, which is a pointed object, from a target of release to be performed by the data release controlling unit.

(Supplementary Note 6)

The storage system, according to supplementary note 5, wherein in a case where a new write pointing to the storage target data or the address data stored in the storage device in a past time zone is generated after the data release controlling unit completes counting of the number of pointers of the storage target data or the address data, if the number of pointers of the storage target data or the address data stored in the storage device in the past time zone, which is a pointed object, has a positive value, or if the storage target data or the address data is excluded from the target of release to be performed by the data release controlling unit, the data storage controlling unit allows to point to the storage target data or the address data corresponding to the new write.

(Supplementary Note 7)

A computer-readable medium storing a program comprising instructions for causing an information processing device to realize:

a data storage controlling unit that stores storage target data and address data in a storage device, the address data being data based on a data content stored in a pointed object and a storage location and pointing to the storage target data or other address data, and when attempting to store, in the storage device, another piece of storage target data having a data content identical to a data content of a piece of the storage target data having been stored in the storage device, stores, in the storage device, the address data pointing to the piece of the storage target data having been stored in the storage device as the other piece of storage target data; and a data release controlling unit that releases a storage region in the storage device, the storage region storing a piece of data, which is not pointed to by other address data, of the storage target data or the address data stored in the storage device, wherein the data storage controlling unit stores the storage target data or the address data in the storage device with respect to each time zone divided in a time-series manner, and the data release controlling unit releases a storage region in the storage device, the storage region storing a piece of data, which is not pointed to by other address data, of the storage target data or the address data stored in the storage device in a past time zone before a current time zone.

(Supplementary Note 8)

The computer-readable medium storing the program, according to supplementary note 7, wherein the data release controlling unit counts the number of pointers from other address data of the storage target data or the address data, and releases a storage region, in the storage device, storing a piece of data in which the number of pointers is "0" of the storage target data or the address data.

(Supplementary Note 9)

An information processing method, comprising:

storing storage target data and address data in a storage device, the address data being data based on a data content stored in a pointed object and a storage location and pointing to the storage target data or other address data, and when attempting to store, in the storage device, another piece of storage target data having a data content identical to a data content of a piece of the storage target data having been stored in the storage device, storing, in the storage device, the address data pointing to the piece of the storage target data having been stored in the storage device as the other piece of storage target data;

releasing a storage region in the storage device, the storage region storing a piece of data, which is not pointed to by other address data, of the storage target data or the address data stored in the storage device;

performing storage of the storage target data or the address data in the storage device with respect to each time zone divided in a time-series manner; and releasing a storage region in the storage device, the storage region storing a piece of data, which is not pointed to by other address data, of the storage target data or the address data stored in the storage device in a past time zone before a current time zone.

(Supplementary Note 10)

The information processing method, according to supplementary note 9, further comprising counting the number of pointers from other address data of the storage target data or the address data, and releasing a storage region, in the storage device, storing a piece of data in which the number of pointers is "0" of the storage target data or the address data.

The invention claimed is:

1. A storage system, comprising:
a CPU;
a data storage controlling unit, implemented by the CPU, that stores storage target data and address data in a storage device, the address data being data based on a data content stored in a pointed object and a storage location and pointing to the storage target data or other address data, and when attempting to store, in the storage device, another piece of storage target data having a data content identical to a data content of a piece of the storage target data having been stored in the storage device, stores, in the storage device, the address data pointing to the piece of the storage target data having been stored in the storage device as the another piece of storage target data; and a data release controlling unit, implemented by the CPU, that releases a storage region in the storage device, the storage region storing a piece of data, which is not pointed to by other address data, of the storage target data or the address data stored in the storage device, wherein the data storage controlling unit stores the storage target data or the address data in the storage device with respect to each time zone divided in a time-series manner, and the data release controlling unit releases a storage region in the storage device, the storage region storing a piece of data, which is not pointed to by other address data, of the storage target data or the address data stored in the storage device in a past time zone before a current time zone.

2. The storage system, according to claim 1, wherein the data release controlling unit counts a number of pointers from other address data of the storage target data or the address data, and releases a storage region, in the storage device, storing a piece of data in which the number of pointers is "0" of the storage target data or the address data.

3. The storage system, according to claim 2, wherein the data release controlling unit counts the number of pointers of the storage target data or the address data written in a last time zone or earlier before the current time zone.

4. The storage system, according to claim 3, wherein the data release controlling unit counts the number of pointers after the data storage controlling unit completes storage, in the storage device, of the storage target data or the address data written in the last time zone.

5. The storage system, according to claim 2, wherein in a case where a new write pointing to the storage target data or the address data stored in the storage device in a past time zone is generated when the data release controlling unit is counting the number of pointers of the storage target data or the address data, the data storage controlling unit sets to exclude the storage target data or the address data stored in the storage device in the past time zone, which is a pointed object, from a target of release to be performed by the data release controlling unit.

6. The storage system, according to claim 5, wherein in a case where a new write pointing to the storage target data or the address data stored in the storage device in a past time zone is generated after the data release controlling unit completes counting of the number of pointers of the storage target data or the address data, if the number of pointers of the storage target data or the address data stored in the storage device in the past time zone, which is a pointed object, has a positive value, or if the storage target data or the address data is excluded from the target of release to be performed by the data release controlling unit, the data storage controlling unit allows to point to the storage target data or the address data corresponding to the new write.

7. A non-transitory computer-readable medium storing a program comprising instructions for causing a CPU included in an information processing device to realize:

a data storage controlling unit, implemented by the CPU, that stores storage target data and address data in a storage device, the address data being data based on a data content stored in a pointed object and a storage location and pointing to the storage target data or other address data, and when attempting to store, in the storage device, another piece of storage target data having a data content identical to a data content of a piece of the storage target data having been stored in the storage device, stores, in the storage device, the address data pointing to the piece of the storage target data having been stored in the storage device as the another piece of storage target data; and a data release controlling unit, implemented by the CPU, that releases a storage region in the storage device, the storage region storing a piece of data, which is not pointed to by other address data, of the storage target data or the address data stored in the storage device, wherein the data storage controlling unit stores the storage target data or the address data in the storage device with respect to each time zone divided in a time-series manner, and the data release controlling unit releases a storage region in the storage device, the storage region storing a piece of data, which is not pointed to by other address data, of the storage target data or the address data stored in the storage device in a past time zone before a current time zone.

8. The non-transitory computer-readable medium storing the program, according to claim 7, wherein the data release controlling unit counts a number of pointers from other address data of the storage target data or the address data, and releases a storage region, in the storage device, storing a piece of data in which the number of pointers is "0" of the storage target data or the address data.

9. An information processing method, comprising:

storing storage target data and address data in a storage device, the address data being data based on a data content stored in a pointed object and a storage location and pointing to the storage target data or other address data, and when attempting to store, in the storage device, another piece of storage target data having a data content identical to a data content of a piece of the storage target data having been stored in the storage device, storing, in the storage device, the address data pointing to the piece of the storage target data having been stored in the storage device as the another piece of storage target data;

releasing a storage region in the storage device, the storage region storing a piece of data, which is not pointed to by other address data, of the storage target data or the address data stored in the storage device;

performing storage of the storage target data or the address data in the storage device with respect to each time zone divided in a time-series manner; and releasing a storage region in the storage device, the storage region storing a piece of data, which is not pointed to by other address data, of the storage target data or the address data stored in the storage device in a past time zone before a current time zone.

10. The information processing method, according to claim 9, further comprising counting a number of pointers from other address data of the storage target data or the address data, and releasing a storage region, in the storage device, storing a piece of data in which the number of pointers is "0" of the storage target data or the address data.

* * * * *